US008696263B2

(12) United States Patent
Saji

(10) Patent No.: US 8,696,263 B2
(45) Date of Patent: Apr. 15, 2014

(54) CUTTING INSERT AND CUTTING EDGE REPLACEABLE CUTTING TOOL

(75) Inventor: Ryuichi Saji, Iwaki (JP)

(73) Assignee: Tungaloy Corporation, Iwaki-shi, Fukusima (JP)

(*) Notice: Subject to any disclaimer, the term of this patent is extended or adjusted under 35 U.S.C. 154(b) by 32 days.

(21) Appl. No.: 13/240,471

(22) Filed: Sep. 22, 2011

(65) Prior Publication Data

US 2012/0009029 A1    Jan. 12, 2012

Related U.S. Application Data

(63) Continuation of application No. PCT/JP2010/056016, filed on Apr. 1, 2010.

(30) Foreign Application Priority Data

Apr. 2, 2009    (JP) .................................. 2009-089734

(51) Int. Cl.
*B23C 5/20* (2006.01)

(52) U.S. Cl.
CPC . *B23C 5/20* (2013.01); *B23C 5/207* (2013.01); *B23C 2200/203* (2013.01)
USPC .......................................... 407/113; 407/114

(58) Field of Classification Search
CPC ............ B23C 5/20; B23C 5/207; B23C 5/22; B23C 2200/0405; B23C 2200/203; B23C 2200/24; B23C 2210/08; B23C 2210/084; B23C 2200/201; B23C 2200/246
USPC ............. 407/34, 47, 48, 61, 62, 67, 113, 114, 407/115, 116
IPC ............................................... B23C 5/20, 5/22
See application file for complete search history.

(56) References Cited

U.S. PATENT DOCUMENTS 4,963,061 A * 10/1990 Katbi et al. .................... 407/114
5,593,255 A * 1/1997 Satran et al. .................. 407/113
(Continued)

FOREIGN PATENT DOCUMENTS

| EP | 0 392 730 A2 | 10/1990 |
| EP | 0 457 488 A1 | 11/1991 |
| EP | 0 925 863 A2 | 6/1999 |
| EP | 1 584 390 A2 | 10/2005 |
| JP | H09-103909 | 4/1997 |
| JP | 2002-066826 | 3/2002 |

(Continued)

OTHER PUBLICATIONS

International Search Report dated Jun. 29, 2010 issued in corresponding International Application No. PCT/JP2010/056016.

(Continued)

*Primary Examiner* — Andrea Wellington
*Assistant Examiner* — Alan Snyder
(74) *Attorney, Agent, or Firm* — Womble Carlyle

(57) ABSTRACT

A cutting insert includes two end surfaces each having a main surface usable as an attachment surface to a tool body, a peripheral side surface extending between the two end surfaces and a plurality of cutting edge portions each formed at an intersection between each end surface and the peripheral side surface. Each cutting edge portion includes a corner edge formed at a corner of a related end surface, a major cutting edge extending from one end of the corner edge and extending so as to depart from an intermediate plane defined to be perpendicular to the first axis and to include the second axis, and a minor cutting edge extending from the other end of the corner edge and extending in a direction to approach the intermediate plane.

20 Claims, 18 Drawing Sheets

(56) References Cited

U.S. PATENT DOCUMENTS

| | | |
|---|---|---|
| 6,293,737 B1 | 9/2001 | Satran et al. |
| 6,413,023 B1 | 7/2002 | Nagashima |
| 7,455,483 B2 * | 11/2008 | Koskinen ............... 407/113 |
| 7,458,753 B1 * | 12/2008 | Niebauer et al. ............ 407/113 |
| 8,177,460 B2 * | 5/2012 | Satran et al. ............... 407/113 |
| 2003/0170079 A1 * | 9/2003 | Daiguji et al. ............. 407/34 |
| 2004/0208713 A1 * | 10/2004 | Duerr et al. ............... 407/34 |
| 2004/0223816 A1 * | 11/2004 | Sheffler et al. ............ 407/34 |
| 2004/0223818 A1 | 11/2004 | Sheffler et al. |
| 2004/0265073 A1 * | 12/2004 | Hoefler et al. ............ 407/34 |
| 2007/0071560 A1 * | 3/2007 | Karonen .................. 407/34 |
| 2008/0008545 A1 * | 1/2008 | Rofner et al. ............. 407/113 |
| 2008/0232912 A1 | 9/2008 | Bhagath |
| 2008/0273930 A1 | 11/2008 | Svenningsson et al. |
| 2010/0034602 A1 * | 2/2010 | Sung et al. ............... 407/113 |

FOREIGN PATENT DOCUMENTS

| | | |
|---|---|---|
| JP | 2005-118965 | 5/2005 |
| JP | H10-086014 | 4/2008 |

OTHER PUBLICATIONS

International Preliminary Report on Patentability (IPRP) dated Oct. 13, 2011 together with English translation of IPRP issued in counterpart PCT Application No. PCT/JP2010/056016.
Official Action dated Mar. 29, 2013 issued in Chinese counterpart application (No. 201080025131.5).
Search Report dated Mar. 29, 2013 issued in Chinese counterpart application (No. 201080025131.5).
Extended Search Report dated Nov. 7, 2013 issued in European counterpart application (No. 10758865.9).

* cited by examiner

CUTTING INSERT AND CUTTING EDGE REPLACEABLE CUTTING TOOL

CROSS-REFERENCE TO RELATED APPLICATIONS

This is a Continuation of International Patent Application No. PCT/JP2010/056016, filed Apr. 1, 2010 and published as WO 2010/114094 on Oct. 7, 2010, which claims priority to Japanese Patent Application No. 2009-089734, filed Apr. 2, 2009. The contents of the aforementioned applications are incorporated by reference in their entirety.

BACKGROUND OF THE INVENTION

1. Field of the Invention

The present invention relates to a cutting insert serving as an edge portion attached to a tool body for cutting work, and a cutting edge replaceable cutting tool using the cutting insert, and more particularly relates to a cutting insert which may be used for high-feed working, and a cutting edge replaceable cutting tool using the cutting insert.

2. Description of the Related Art

A cutting edge replaceable end mill has been generally employed as the tool used for cutting work of a die or the like, in which a cutting insert is attached as an edge portion to a leading end portion of substantially cylindrical tool body that is revolved around its axis.

Strength of the insert for the aforementioned cutting edge replaceable cutting tool is one of major matters for improving the working efficiency in, for example, high-feed working. Japanese Patent Laid-Open No. 2005-118965 discloses that the strength of the insert is intensified by setting the ratio between the section area defined by width, thickness and diameter of a center mounting hole of the insert and the section area defined by length, thickness, and the center mounting hole of the insert to be equal to or larger than a predetermined value.

SUMMARY OF THE INVENTION

The structure for intensifying the strength of the insert as disclosed in Japanese Patent Laid-Open No. 2005-118965 has a constraint that predetermined correlation among such properties as length, width, thickness, and diameter of the center mounting hole of the insert is required to be established, and thereby there is a problem that it may reduce the degree of freedom for designing the cutting tool and insert. It is preferable to devise configuration of the insert, especially cutting edge itself so as to intensify the strength while avoiding the aforementioned problem.

The present invention has been made in consideration of the above-described circumstances, and it is an object of the present invention to provide a cutting insert capable of intensifying strength of the leading end portion of the tool without deteriorating freedom degree of design, and a cutting edge replaceable cutting tool using the cutting insert.

The present invention provides a cutting insert, and the cutting insert includes an end surface having an edge portion and including a first surface and, on a back side thereof, a second surface which is usable as an attachment surface to a tool body; and a cutting edge portion formed on the edge portion of the end surface, wherein an intermediate plane, which is perpendicular to a first axis passing through the first surface and the second surface and passes through the cutting insert, is defined; the cutting edge portion includes: the cutting edge portion includes: a corner edge formed at a corner of said end surface; a major cutting edge extending from one end of the corner edge, and extending so that a distance between the major cutting edge and the intermediate plane becomes longer than a distance between the first surface and the intermediate plane; and a minor cutting edge extending from the other end of the corner edge, and extending so that a distance between the minor cutting edge and the intermediate plane becomes shorter than a distance between the first surface and the intermediate plane.

Preferably, a cutting insert according to the present invention includes two opposed end surfaces having a same shape, and each having a main surface usable as an attachment surface to a tool body; a peripheral side surface extending between the two end surfaces; and a plurality of cutting edge portions each formed at an intersection between each end surface and the peripheral side surface, wherein each of the two end surfaces has rotational symmetry around a first axis which passes through the two end surfaces, and the two end surfaces have rotational symmetry around a second axis which is perpendicular to the first axis and passes through the peripheral side surface; the plurality of cutting edge portions is arranged so as to have rotational symmetry about the first axis and a rotational symmetry about the second axis; and an intermediate plane, which is perpendicular to the first axis and passes through the peripheral side surface including the second axis, is defined; and wherein each cutting edge portion includes: a corner edge formed at a corner of a related end surface; a major cutting edge extending from one end of the corner edge and extending so that a distance between the major cutting edge and the intermediate plane becomes longer than a distance between the main surface of the related end surface and the intermediate plane; and a minor cutting edge extending from the other end of the corner edge and extending so that a distance between the minor cutting edge and the intermediate plane becomes shorter than a distance between the main surface of the related end surface and the intermediate plane. It should be noted that preferably, the main surface is a flat surface.

Preferably, each end surface has a substantially hexagonal contour. Preferably, each end surface includes, in an edge portion thereof, two pairs of short side portions oppositely positioned to each other and a pair of long side portions oppositely positioned to each other. The corner edge may be formed between two adjacent short sides. An angle formed by the major cutting edge and the minor cutting edge in the same cutting edge portion may be larger than an angle formed by the major cutting edge and the long side portion adjacent to the major cutting edge. At least a part of each long side portion may be chamfered.

Each main surface and the peripheral side surface may form a right angle. Preferably, in each end surface, the main surface is formed so as to extend near an end portion opposite to the end portion connected to the corner edge of the minor cutting edge of the adjacent cutting edge portion.

Preferably, in each cutting edge portion, the major cutting edge extends so as to depart from the intermediate plane with increasing distance from the corner edge. Preferably, in each cutting edge portion, at least half of the minor cutting edge extends in parallel to the main surface of a related end surface.

It is preferable to form a concave chip breaker between each cutting edge portion and the main surface of a related end surface. Preferably, each chip breaker includes a first inclined portion near an adjacent cutting edge portion, a second inclined portion near an adjacent main surface, and a flat bottom portion extending between the first inclined portion and the second inclined portion. A distance between the bottom portion of each chip breaker and the intermediate plane may be shorter than a distance between the main surface of related end surface and the intermediate plane. Preferably, a line extending along an intersection between the second inclined portion of each chip breaker and the main surface adjacent to the second inclined portion intersects a line extending along the major cutting edge of adjacent cutting edge portion.

Preferably, each cutting edge portion further includes a second corner edge to which the major cutting edge extends, and a second minor cutting edge extending from the second corner edge.

In addition, the present invention provides a cutting edge replaceable cutting tool, and this cutting edge replaceable cutting tool is provided with a tool body to which the cutting insert is detachably mounted, and includes an insert attachment seat formed in the tool body, to which the cutting insert is attached; and an upper wall portion integrally formed with the tool body and overhanging the insert attachment seat. Preferably, the tool body includes a plurality of insert attachment seats and a plurality of upper wall portions for attaching a plurality of cutting inserts. Another insert attachment seat adjacent to the insert attachment seat may be formed on the upper wall portion which overhangs the insert attachment seat. Preferably, the upper wall portion covers at least a part of the cutting insert when the cutting insert is attached to the insert attachment seat.

Further features of the present invention will become apparent from the following description of exemplary embodiments (with reference to the attached drawings).

DETAILED DESCRIPTION

Hereinafter, a cutting insert and a cutting edge replaceable cutting tool using the cutting insert according to the present invention will be described based on embodiments.

Figure 7:
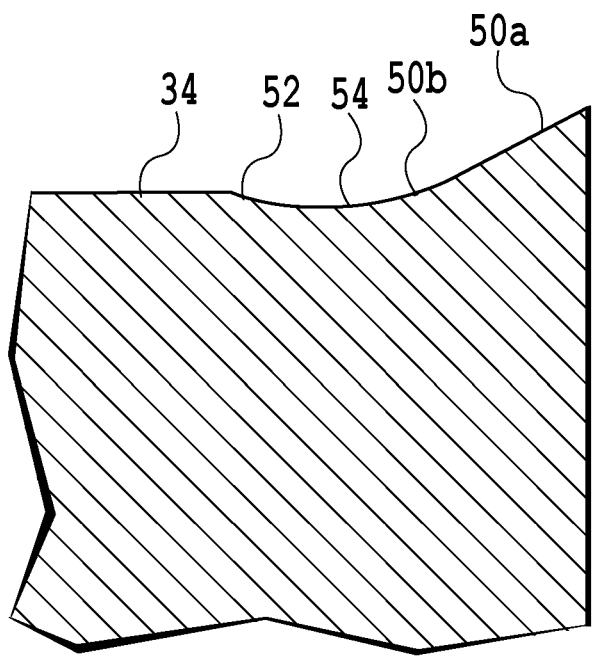
FIG. 7 is an enlarged view of a portion around a chip breaker shown in FIG. 6.
Figure 8:
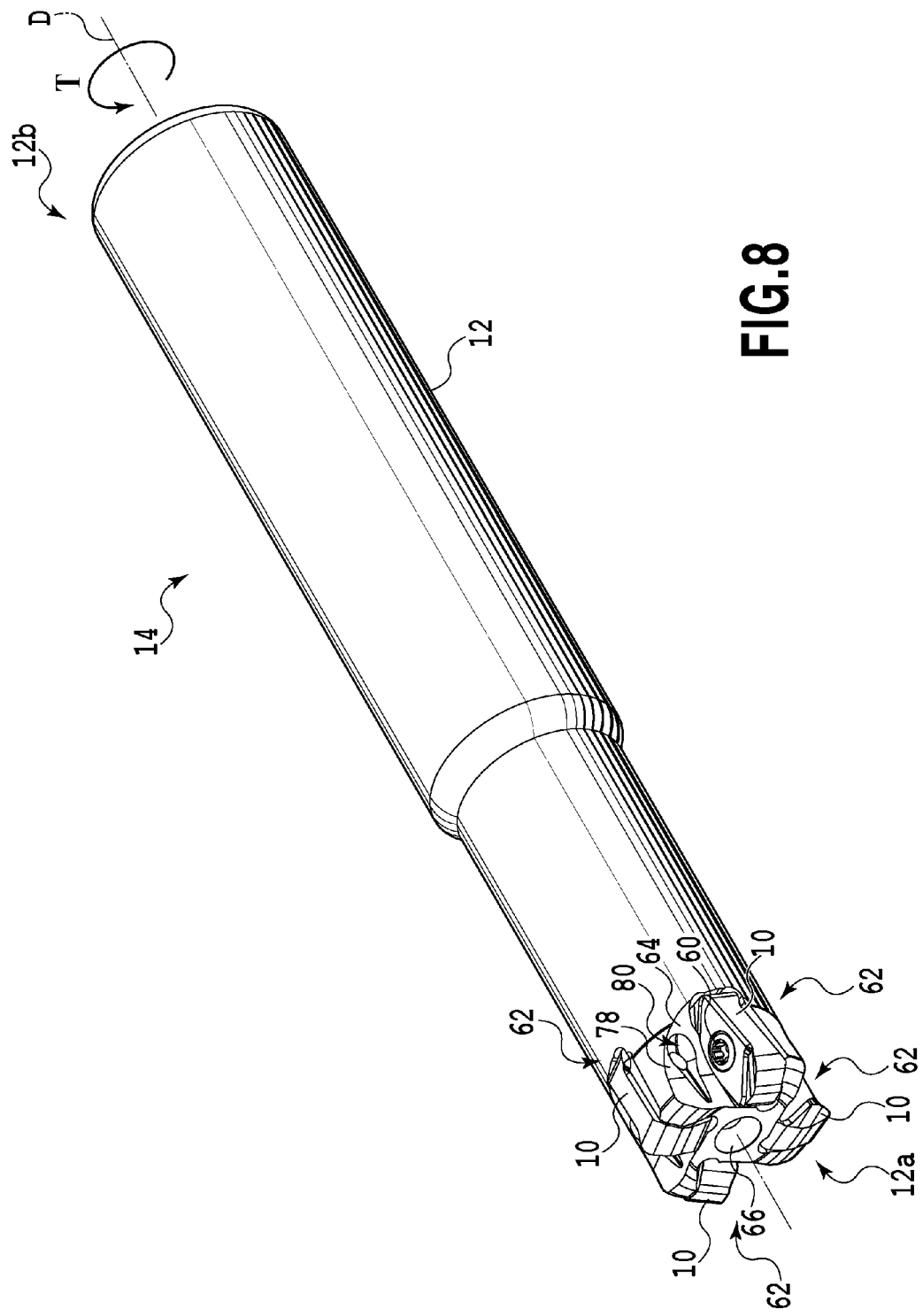
FIG. 8 is a perspective view showing a cutting edge replaceable cutting tool according to the first embodiment of the present invention.

A cutting insert according to a first embodiment of the present invention and a cutting edge replaceable cutting tool using the cutting insert will be described referring to FIGS. 1 to 14. First, the cutting insert 10 according to the first embodiment will be described. The cutting insert 10 according to the first embodiment is mainly shown in FIGS. 1 to 7 and the cutting edge replaceable end mill 14 having the cutting inserts 10 attached to an end mill main body 12 is shown in FIG. 8.

The cutting insert 10 according to the first embodiment is structured to be reversibly attached to the end mill body 12 while having both surfaces available, that is, so called the insert with negative configuration. The cutting insert 10 has substantially a hexagonal flat-plate shape. The cutting insert 10 comprises two opposed end surfaces 20, which are a first end surface 20a and a second end surface 20b, and a peripheral side surface 22 which extends between those end surfaces 20a and 20b. A mounting hole 24 which pierces the cutting insert 10 in the thickness direction, that is, pierces between the first end surface 20a and the second end surface 20b is formed in the cutting insert 10. It should be noted that the cutting insert 10 may be formed of a cemented carbide, cermet, ceramics and the like, and in this case, it is formed of the cemented carbide.

The first end surface 20a has the same shape as that of the second end surface 20b. Those first end surface 20a and second end surface 20b have rotational symmetry around an axis B which is perpendicular to an axis A of the mounting hole 24 and passes through the peripheral side surface 22 of the cutting insert 10, and specifically, they have rotational symmetries through 180° around the axis B. Meanwhile, the axis A passes through both end surfaces 20 so as to pass through each center of the first end surface 20a and the second end surface 20b, and the axis B extends on an intermediate plane M, which is defined to be perpendicular to the axis A at the intermediate position between the first end surface 20a and the second end surface 20b to pass through the peripheral side surface 22.

Figure 2:
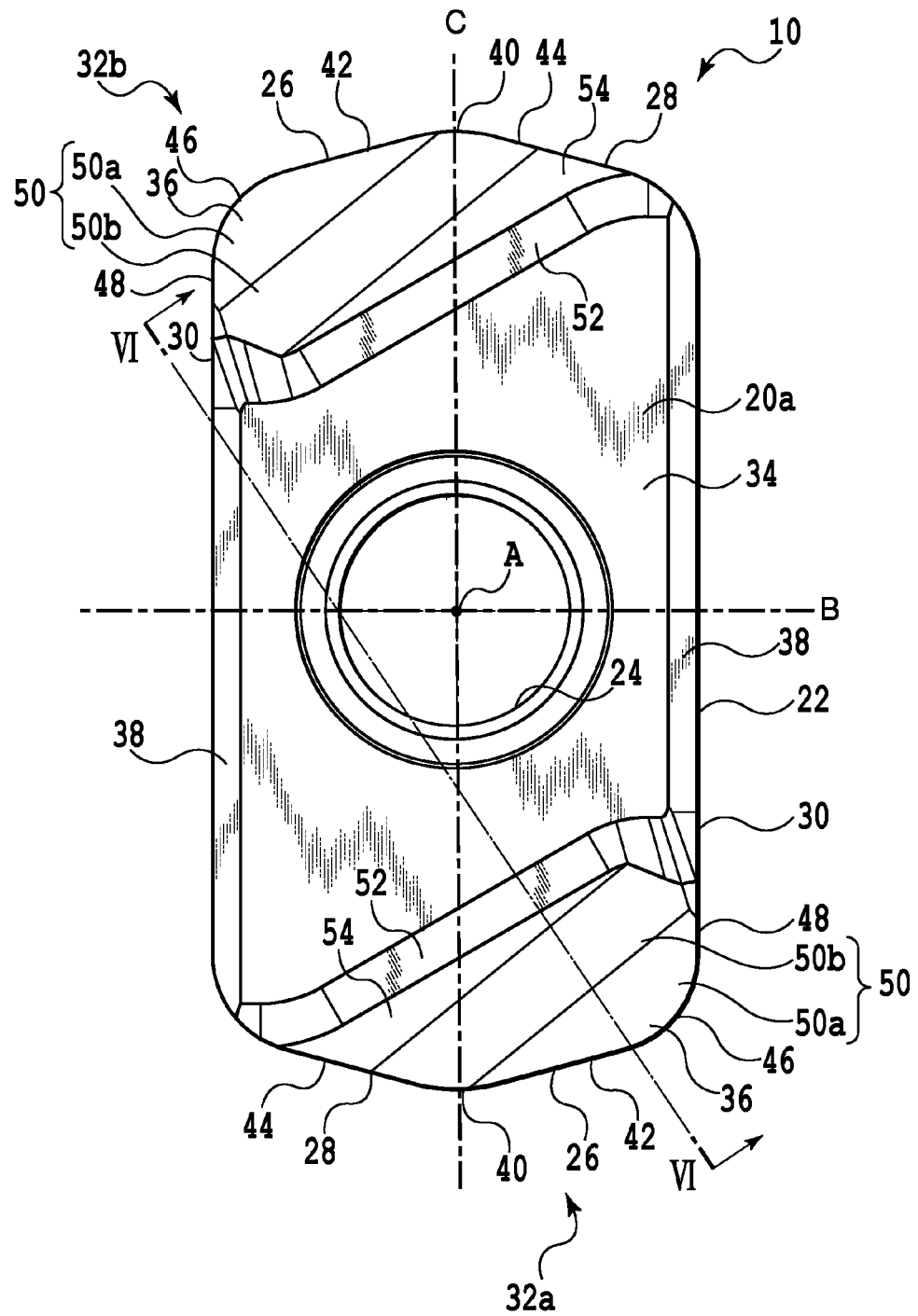
FIG. 2 is a plan view of the cutting insert shown in FIG. 1.

As shown in FIG. 2, the cutting insert 10 as a plan view has a substantially hexagonal shape defined substantially by two pairs of short sides 26 and 28, in each of which the sides are opposed to each other, and a pair of parallel long sides 30 which are opposed to each other so as to connect the respective ends of pairs of short sides. Each end surface 20 of the cutting insert 10 has a substantially hexagonal contour. The cutting insert 10 as a plan view has a longitudinal length of 12 mm (distance between a corner located between the adjacent short sides 26, 28 and a corner located between the opposite adjacent short sides 26, 28), and the lateral length of 6 mm (distance between the long sides 30, 30), and further has a thickness of 3.18 mm (distance between flat surfaces of those two end surfaces 20a, 20b) in the side view. However, the longitudinal length of the cutting insert 10 is the length of a line segment obtained when a line on an axis C which is perpendicular to the axis A and the axis B is cut by the peripheral side surface 22, and the lateral length of the cutting insert 10 is the length of a line segment obtained when a line on the axis B is cut by the peripheral side surface 22.

It should be noted that the axis A can be referred to as a first axis, and the axis B or C can be referred to as a second axis or a third axis, respectively. However, the axis C extends on the intermediate plane M.

The cutting insert 10 includes four cutting edge portions 32 each formed at an intersection, which corresponds to an edge of each end surface 20, between each end surface 20 and the peripheral side surface 22, and two flat surfaces 34 each usable as an attachment surface to the end mill body 12, that is, functioning as the attachment surface. One flat surface 34 of those two flat surfaces 34 is formed on the first end surface 20a, and the other flat surface 34 is formed on the second end surface 20b. The flat surface corresponds to a main surface according to the present invention. Two flat surfaces 34 are in parallel with each other, each of which intersect the peripheral side surfaces 22 at a right angle. A chip breaker 36 is provided between each of the cutting edge portions 32 and the corresponding adjacent flat surface 34. Each of the chip breakers 36 is associated with the cutting edge portion 32 formed at the edge of the end surface 20 on which the chip breaker is formed and the flat surface 34 formed on the end surface 20 on which the chip breaker is formed. The cutting insert 10 has four cutting edge portions 32, and accordingly, four chip breakers 36. Each of the chip breakers 36 is provided for, for example, breaking chips flowing from the cutting process into appropriate small fragments. The cutting insert 10 has portions other than the cutting edge portions 32 chamfered along the long side 30 of each of both end surfaces 20 (20a, 20b). As a result of this, chamfered portions 38 are formed. The chamfering angle is set to 45°, and the chamfering width is set to 0.2 mm to 1.0 mm.

As shown in FIGS. 1 to 4, the four cutting edge portions 32 are formed of two pairs of cutting edge portions 32. One of those pairs of cutting edge portions 32a and 32b is formed at the intersection between the first end surface 20a and the peripheral side surface 22 so as to have a configuration (point symmetric shape) having rotational symmetries through 180° about the axis A. The other pair of cutting edge portions 32c and 32d is formed at the intersection between the second end surface 20b and the peripheral side surface 22 so as to have a configuration having rotational symmetries through 180° about the axis B or C to the one pair of cutting edge portions 32a and 32b. It should be noted that the other pair of cutting edge portions 32c and 32d is formed so as to have a configuration having rotational symmetrics through 180° about the axis A. When one of the cutting edge portions, for example, 32a on the first end surface 20a is used for cutting and damaged, the cutting insert 10 is revolved around the axis A at 180° and is attached to the end mill body 12m so that the cutting can be performed by the diagonal unused cutting edge portion 32b. Additionally, when those two cutting edge portions 32a and 32b on the first end surface 20a are all damaged, the cutting insert 10 is revolved around the axis B, and is attached to the end mill body 12 so that the cutting can be performed by any one of the unused cutting edge portions 32c and 32d on the second end surface 20b. In this way, the cutting insert 10 has four cutting edge portions 32. Each of those cutting edge portions 32 has the same structure, and accordingly, matters related to the cutting edge portion 32a on the first end surface 20a will be mainly described hereinafter.

The cutting edge portion 32a includes a first corner edge 40 corresponding to a corner edge according to the present invention, a major cutting edge 42 corresponding to a major cutting edge according to the present invention, extending from one end of the first corner edge 40, and a first minor cutting edge 44 corresponding to a minor cutting edge according to the present invention, extending from the other end of the first corner edge 40. The first corner edge 40 is formed at a corner between the short side 26 of the first end surface 20a and the short side 28 adjacent to the short side 26. The major cutting edge 42 extends along the short side 26, and the first minor cutting edge 44 extends along the other short side 28. As best seen in FIG. 2, two longitudinally spaced apart first corner edges 40 belonging to opposite cutting edge portions 32a, 32b lie on the axis C, which is perpendicular to both the axis A and axis B. A distance between the two longitudinally spaced apart first corner edges 40 corresponds to the longitudinal length of the cutting insert.

Furthermore, the cutting edge portion 32a includes a second corner edge 46 having one end to which the major cutting edge 42 extends, and a second minor edge 48 which extends from the other end of the second corner edge 46. The second corner edge 46 is formed at another corner of the first end surface 20a adjacent to the corner at which the first corner edge 40 is formed, that is, the corner formed between the short side 26 and the long side 30 of the first end surface 20a. The second minor cutting edge 48 extends from the second corner edge 46 away from the major cutting edge 42. The second minor cutting edge 48 extends along the long side 30 connected to the second corner edge 46.

Figure 1:
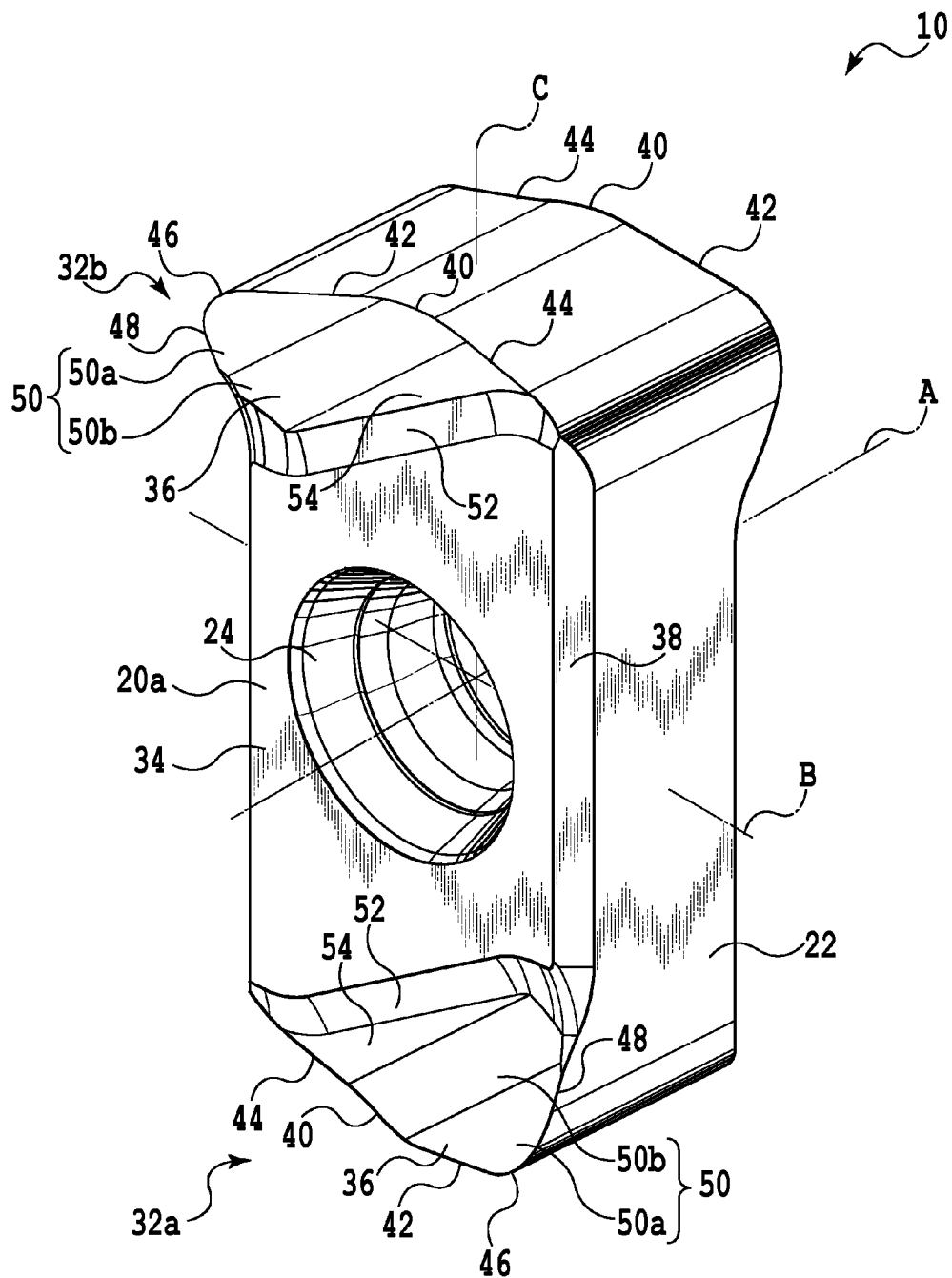
FIG. 1 is a perspective view of a cutting insert according to a first embodiment of the present invention.

It should be noted that as described above, the first end surface 20a and the second end surface 20b have rotational symmetry about the axis B, the first minor cutting edge 44 on the second end surface 20b exists at the back side of the major cutting edge 42 on the first end surface 20a (referring to FIG. 1).

In the side view and front view of the cutting insert 10 (referring to FIGS. 3 and 4), the major cutting edge 42 is formed to be higher than the flat surface 34 as the attachment surface to the end mill body 12. In other words, the major cutting edge 42 extends from one end of the first corner edge 40 so as to extend away from and outside a virtual surface IS which contains the adjacent flat surface 34, that is, so that the distance between the major cutting edge 42 and the intermediate plane M becomes longer than the distance between the flat surface 34 of the related end surface 20a and the intermediate plane M (referring to FIG. 4). Especially, the major cutting edge 42 is formed to gradually rise in the thickness direction of the cutting insert 10, and to extend away from the intermediate plane M as it departs from the first corner edge 40. The major cutting edge 42 is an inclined edge which substantially linearly inclines. In FIG. 4, an inclined angle θ between the major cutting edge 42 and the flat surface 34, that is, the virtual surface IS is set to 18° here.

Figure 3:
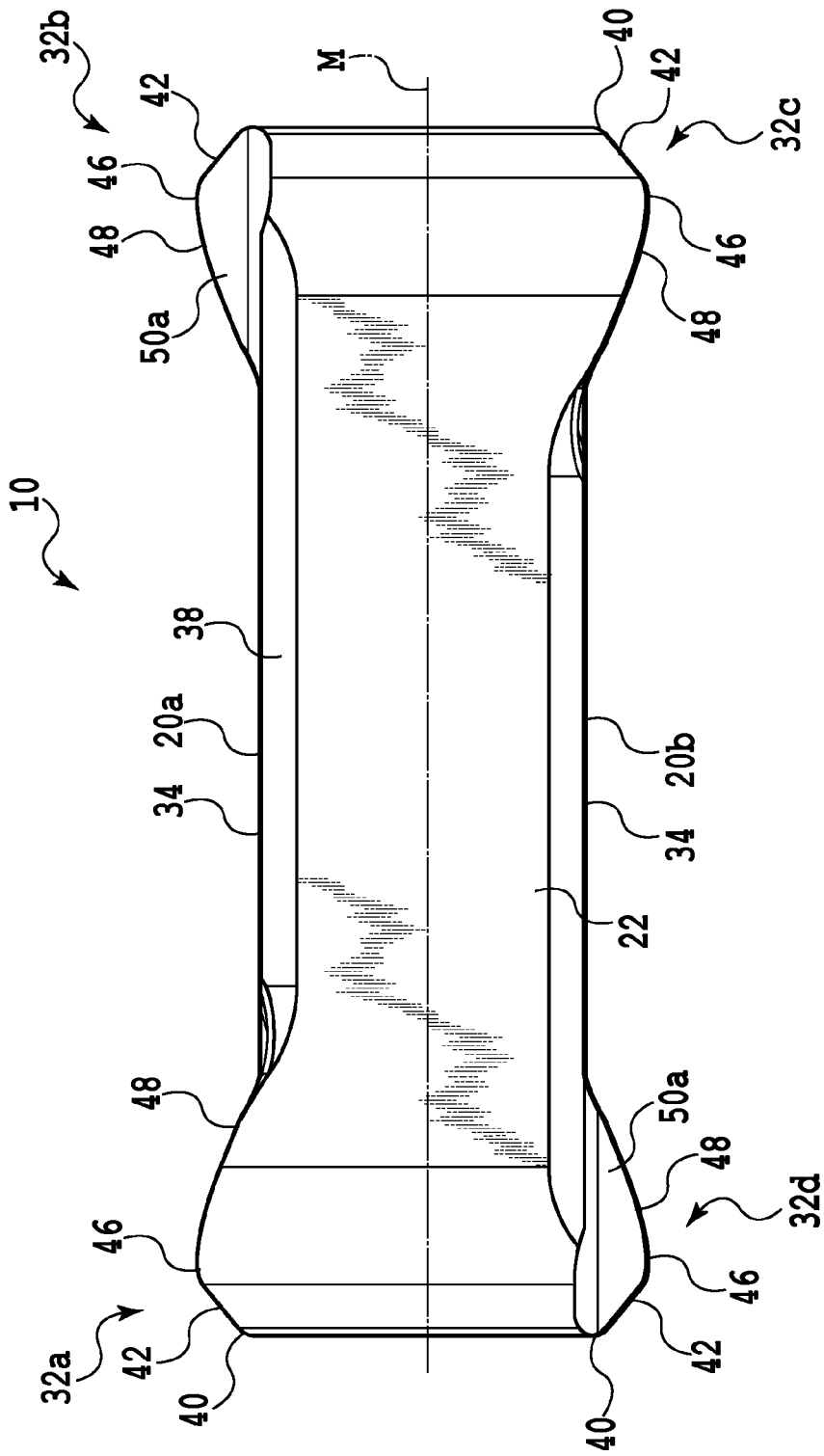
FIG. 3 is a side view of the cutting insert shown in FIG. 1.
Figure 4:
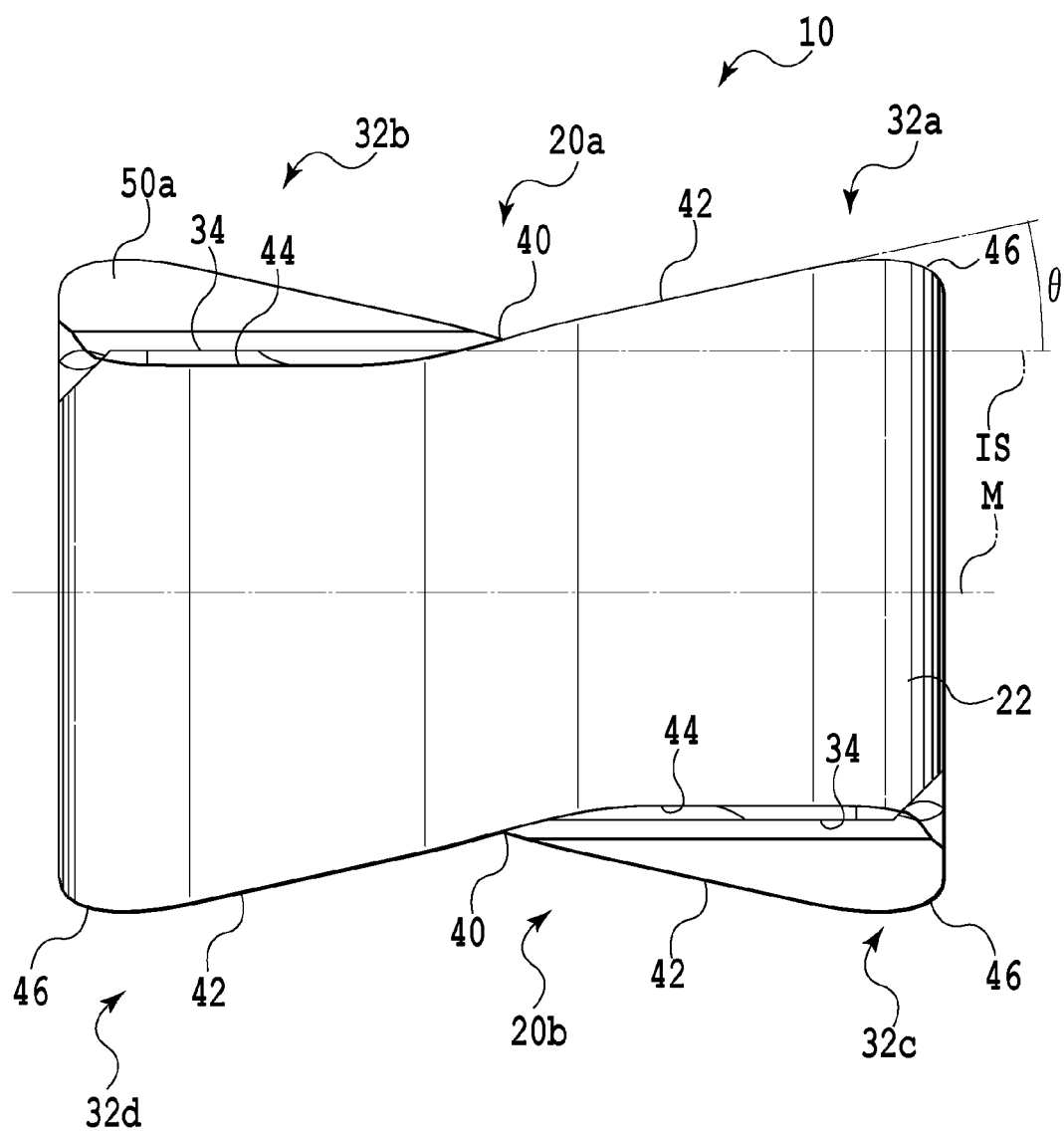
FIG. 4 is a front view of the cutting insert shown in FIG. 1.

Meanwhile, a major part of the first minor cutting edge 44 is formed to be lower than the flat surface 34 as the attachment surface to the end mill body 12, in the side view and the front view of the cutting insert 10 (referring to FIGS. 3 and 4). That is, the first minor cutting edge 44 extends from the other end of the first corner edge 40 so that the distance between the first minor cutting edge 44 and the intermediate plane M becomes shorter than the distance between the flat surface 34 of the related end surface 20a and the intermediate plane M (referring to FIG. 4). Referring to FIG. 4, half or more part of the first minor cutting edge 44 is in parallel with the flat surface 34. In this case, the difference in height between the first minor cutting edge 44 and the flat surface 34 in FIG. 4 is set to 0.1 mm.

In the side view of the cutting insert as shown in FIG. 3, the second minor cutting edge 48 is formed to be higher than the flat surface 34 as the attachment surface to the end mill body 12. That is, the second minor cutting edge 48 extends from the second corner edge 46 so that the distance between the second minor cutting edge 48 and the intermediate plane M is longer than the distance between the flat surface 34 of the related end surface 20a and the intermediate plane M. Especially, the second minor cutting edge 48 is formed to gradually retract in the thickness direction of the cutting insert 10 as it departs from the second corner edge 46. So the second minor cutting edge 48 approaches the intermediate plane M as it departs from the second corner edge 46. The second minor cutting edge 48 is substantially an inclined edge.

Figure 5:
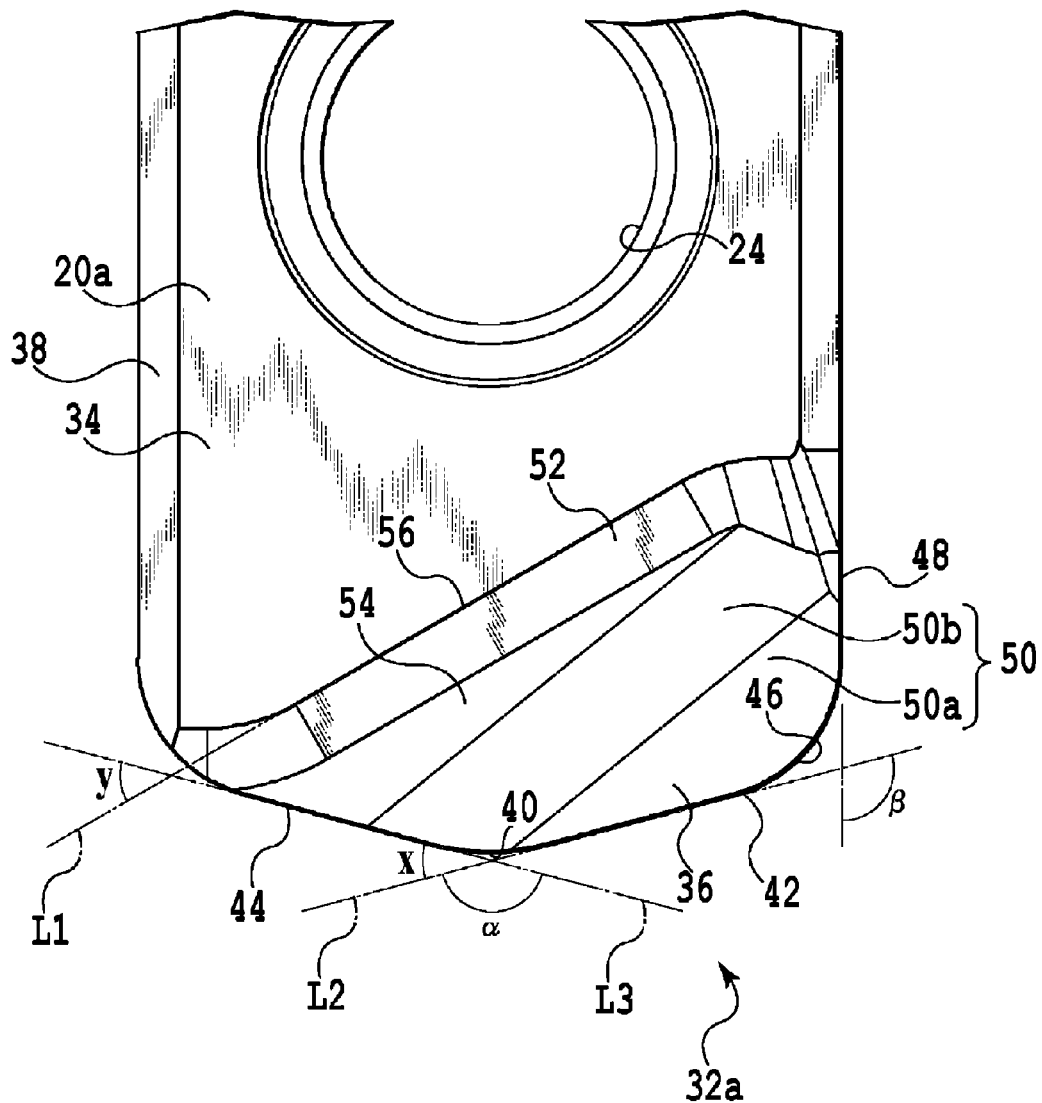
FIG. 5 is an enlarged plan view of a portion around a cutting edge portion of the cutting insert shown in FIG. 2.

Referring to FIG. 5, in the cutting edge portion 32a of the first end surface 20a, an angle α formed by the major cutting edge 42 and the first minor cutting edge 44 is larger than an angle β formed by the major cutting edge 42 and the second minor cutting edge 48 of the long side 30 adjacent to the major cutting edge 42, and the angle α is set to 150° here. It should be noted that the angle β is set to 105° here. When attaching the cutting insert 10 to the end mill body 12, it is structured so that a cutting edge angle κ of the major cutting edge 42 is set to 19° (referring to FIG. 10).

Meanwhile, when the cutting insert 10 is attached to the end mill body 12, the first corner edge 40 is capable of functioning as a bottom edge while being directed to a tip side of the end mill body 12. When the cutting insert 10 is attached to the end mill body 12, the major cutting edge 42 can be mainly used for the cutting while being directed to the outer peripheral side of the tip of the end mill body. When the cutting insert 10 is attached to the end mill body 12, the first minor cutting edge 44 is capable of functioning as an inner peripheral edge while being directed to the inner peripheral side of the end mill body 12. When the cutting insert 10 is attached to the end mill body 12, the second minor cutting edge 48 is capable of functioning as an outer peripheral edge while being directed to the outer peripheral side of the end mill body 12.

As shown in FIG. 2, the flat surface 34 is apart from each of the cutting edge portions 32 by a predetermined distance on each of both end surfaces 20a and 20b, respectively. The flat surface 34 is formed so as to extend to the portion near the end portion opposite to the one connected to the first corner edge 40 in the first minor cutting edge 44 of the adjacent cutting edge portion 32, and more specifically, to extend toward the corner of the end surface connected to the end portion.

Figure 6:
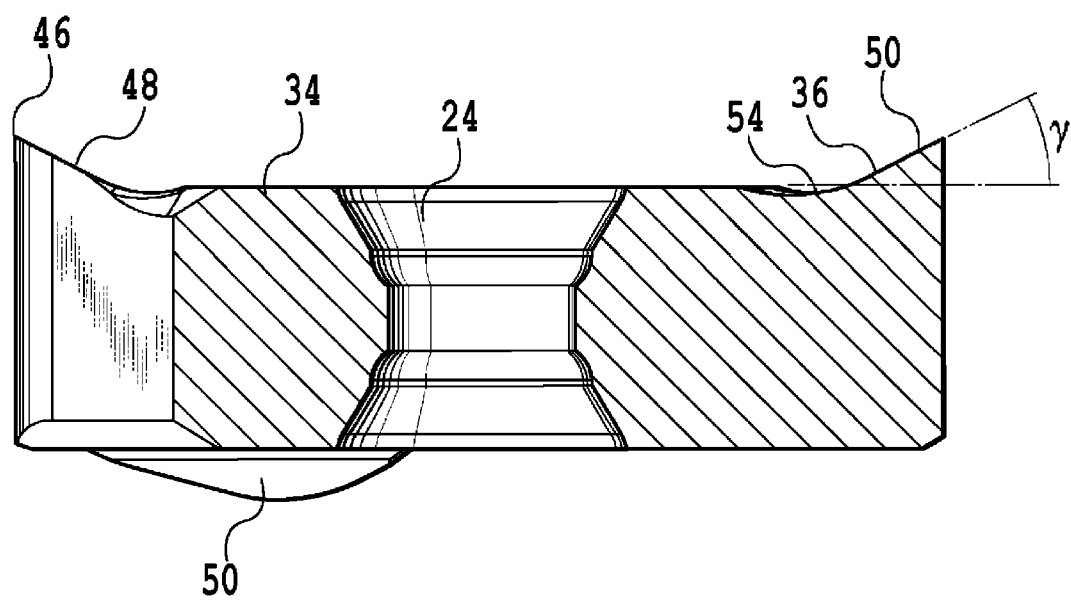
FIG. 6 is a sectional view of the cutting insert cut in a plane along line VI-VI shown in FIG. 2.

The chip breaker 36 provided between each of the cutting edge portions 32 and the flat surface 34 on the related end surface has a concave shape as a recess formed in the thickness direction of the cutting insert 10. Each of the concave groove-like chip breakers 36 is formed on the end surface 20 so as to be connected to the first corner edge 40, the major cutting edge 42, the first minor cutting edge 44, the second corner edge 46, and the second minor cutting edge 48 of the adjacent cutting edge portion 32 as shown in FIGS. 2, 6 and 7. Each of the chip breakers 36 includes a first inclined portion 50 adjacent to the adjacent cutting edge portion 32, a second inclined portion 52 adjacent to the adjacent flat surface 34, and a flat bottom portion 54 extending between the first inclined portion 50 and the second inclined portion 52.

The first inclined portion 50 is formed of an inclined surface 50a and a concave curved surface 50b. The inclined surface 50a of the first inclined portion 50 is a flat inclined surface which extends along the major cutting edge 42, the second corner edge 46 and the second minor cutting edge 48, and is inclined at a predetermined angle to the inside of the cutting insert 10. The inclined surface 50a is formed to gradually retract downward in the thickness direction as it departs from the major cutting edge 42, the second corner edge 46 and the second minor cutting edge 48, that is, to approach the intermediate plane M. The inclined angle γ of the inclined surface 50a is set to 25° here (referring to FIG. 6). It should be noted that when the cutting insert 10 is attached to the end mill body 12, the inclined surface 50a is configured to function as a rake face. The concave curved surface 50b of the first inclined portion 50 is a surface formed by smoothly connecting the inclined surface 50a to the bottom portion 54.

The bottom portion 54 is a flat surface connected to a part of the first minor cutting edge 44 between the concave curved surface 50b of the first inclined portion 50 and the second inclined portion 52. The bottom portion 54 is configured to be positioned in the cutting insert 10 while being recessed inward. So the distance between the bottom portion 54 and the intermediate plane M is shorter than the distance between the related flat surface 34 and the intermediate plane M.

The second inclined portion 52 is an inclined surface which rises from the bottom portion 54 toward the flat surface 34 at a predetermined angle. The second inclined portion 52 gradually rises to the outside in the thickness direction of the cutting insert 10 as it approaches the flat surface 34 from the bottom portion 54.

In FIGS. 2 and 5, the cutting edge portion 32, the chip breaker 36 and the flat surface 34 are correlated so that a line L1 extending along an intersection 56 between the second inclined portion 52 and the flat surface 34 adjacent to the second inclined portion 52 intersects a line L2 extending along the major cutting edge 42 of the adjacent cutting edge portion 32. An angle γ formed by the line L1 extending along the intersection 56 and a line L3 extending along the first minor cutting edge 44 is set to be larger than an external angle x (x=180°−α) that is defined assuming that the angle α formed by the line L2 extending along the major cutting edge 42 and the line L3 extending along the first minor cutting edge 44 is set as the internal angle.

As shown in FIG. 8, the above-structured cutting insert 10 is attached to the end mill body 12 as a tool body. A cutting edge replaceable end mill 14 according to the first embodiment can be revolved around an axis D which extends from the leading end side to a base end side. The cutting edge replaceable end mill 14 includes the end mill body 12 as the tool body, and in its leading end portion four cutting inserts 10 are detachably mounted. Each of the cutting inserts 10, which constitutes the edge portion, is attached to the leading end portion 12a of the end mill body 12 using a fixing screw 60. It should be noted that the cutting edge replaceable cutting tool according to the present invention is not limited to the structure with a plurality of cutting inserts, but may be configured to have a single cutting insert.

The end mill body 12 has a substantially cylindrical shape, and can be formed of a high-speed steel, a tool steel, an alloy steel, a stainless steel, a cemented carbide or the like. The end mill body 12 has its surface subjected to rust-proofing process (black oxide finish), hardening treatment (nitriding, hard plating) or the like, if required.

As shown in FIGS. 8 to 11, four insert attachment seats 62 are formed in the leading end portion 12a of the end mill body 12, each of which allow the cutting insert 10 to be attached. It is further provided with an upper wall portion 64 which overhangs the insert attachment seat 62. The upper wall portion 64 is integrally formed with the end mill body 12. The upper wall portion 64 is provided for each of the respective insert attachment seats 62. Four insert attachment seats 62 and four upper wall portions 64 are provided at substantially equal intervals in a circumferential direction of the end mill body 12. However, each number of the insert attachment seats 62 and the upper wall portions 64 may be arbitrarily set. It should be noted that in this case, diameter of the leading end portion 12a of the end mill body 12 is set to 20 mm.

In the end mill body 12, a through hole 66 configured to extend from the leading end portion 12a of the tool to the base end portion 12b along the axis D for injecting the fluid is pierced. Upon working of the workpiece using the cutting edge replaceable end mill 14, the cutting fluid, air, the mixture mist formed by mixing the cutting fluid and air or the like, which is externally supplied, can be injected from the leading end portion of the tool of the cutting edge replaceable end mill 14 through the through hole 66.

Figure 11:
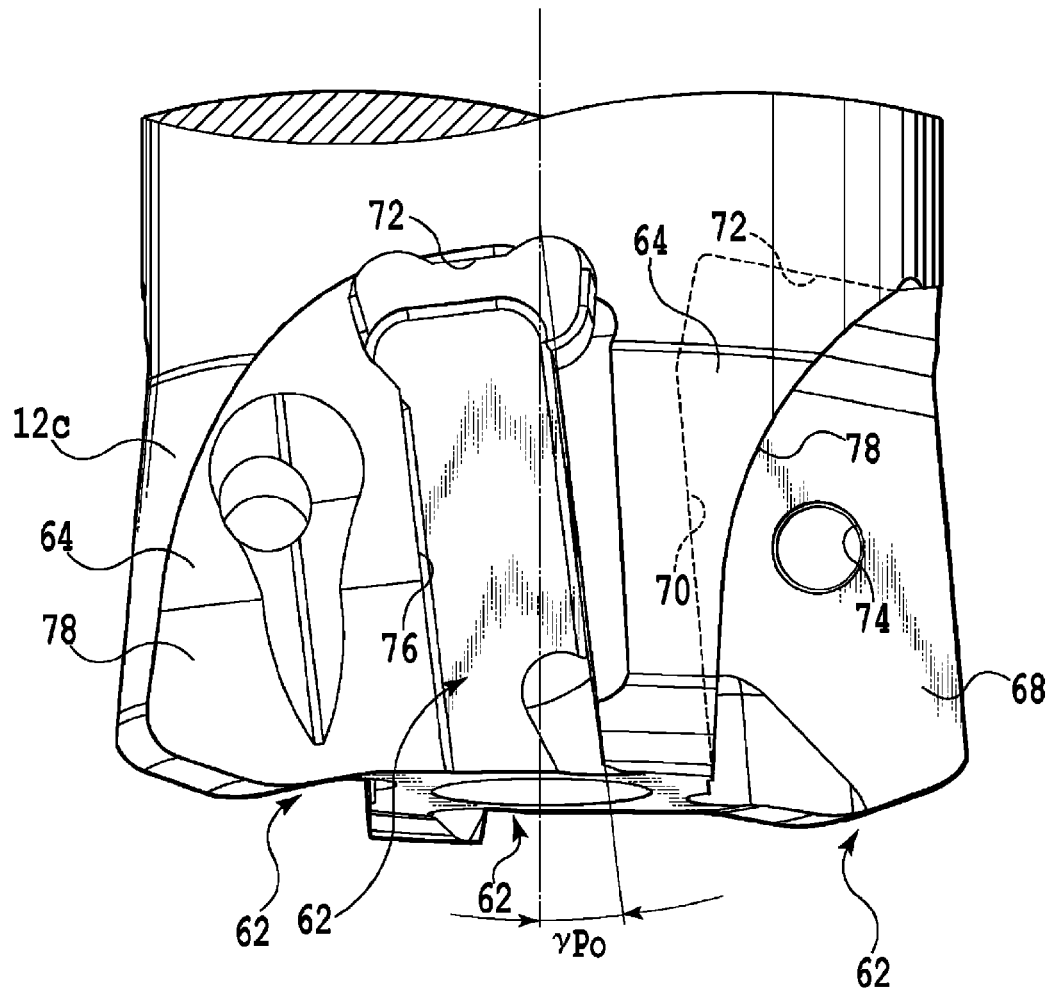
FIG. 11 is a side view showing the leading end portion of the cutting edge replaceable cutting tool shown in FIG. 8, from where the cutting inserts are removed.

As shown in FIG. 11, each of the insert attachment seats 62 includes a bottom wall surface 68, and side wall surface 70 and end wall surface 72 which extend (stand) to form right angle with the bottom wall surface 68. The bottom wall surface 68 is a flat surface in parallel with a plane which contains the axis D. The side wall surface 70 is configured to be directed to the outer peripheral side of the tool. The end wall surface 72 is configured to intersect with the side wall surface 70 and to be directed to the leading end side of the tool. A screw hole 74 is formed in a center of the bottom wall surface 68. The fixing screw 60 is screwed into the screw hole 74.

On the other hand, as described above, the upper wall portion 64 that overhangs the insert attachment seat 62 is provided in the end mill body 12. The upper wall portion 64 is formed with respect to the insert attachment seat 62, and has an upper wall surface 76 opposite to the bottom wall surface 68. The upper wall surface 76 is opposed to the bottom wall surface 68 and extends to form a right angle with the side wall surface 70 and the end wall surface 72 of the insert attachment seat 62. The thus structured upper wall portion 64 covers at least a part of the cutting insert 14, when the cutting insert 10 is attached to the insert attachment seat 62 (especially referring to FIG. 10).

Figure 10:
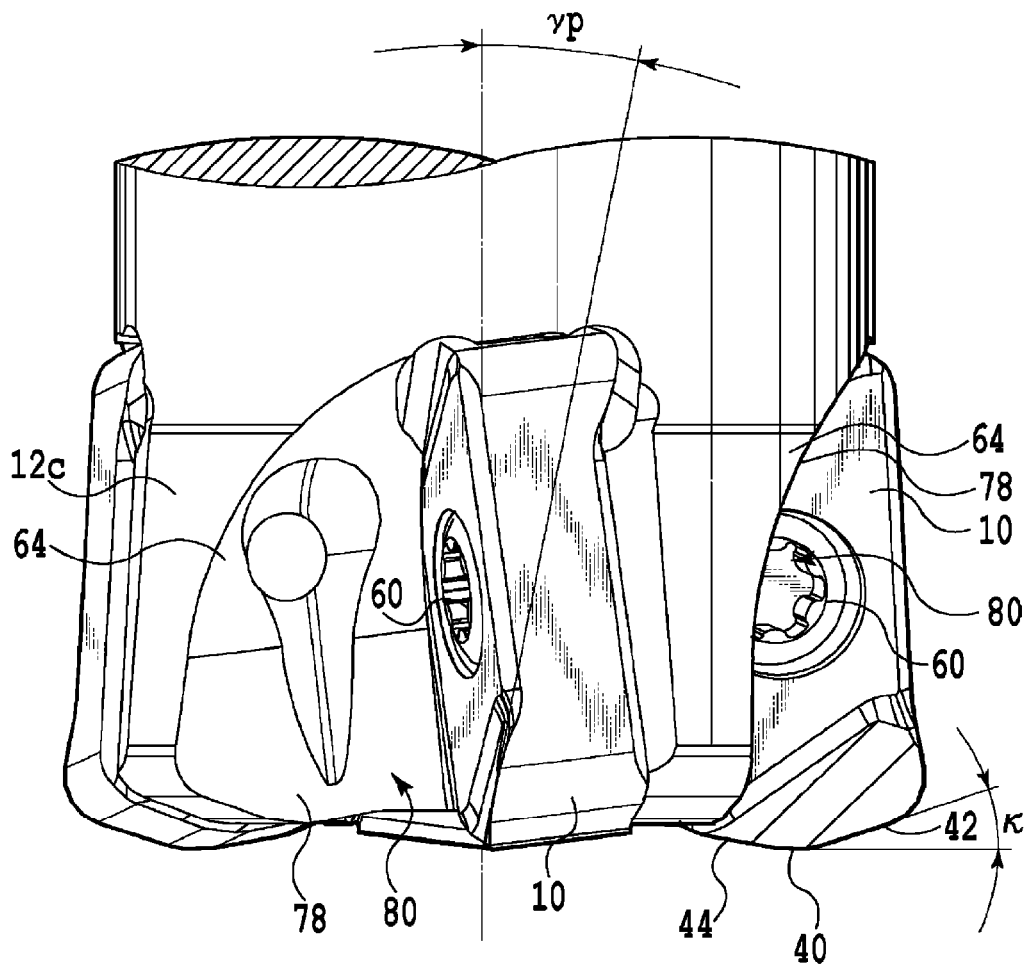
FIG. 10 is a side view of the cutting edge replaceable cutting tool shown in FIG. 8.

Roughly, the upper wall portion 64 is configured in such a manner as to overhang the insert attachment seat 62 by the overhang amount which is gradually increased from the leading end side toward the base end side (referring to especially FIGS. 10 and 11). That is, the upper wall portion 64 is configured so that the overhang amount at the base end side over the insert attachment seat 62 is larger than the overhang amount at the leading end side.

The thus structured upper wall portion 64 has a side surface 78 directed to the outer peripheral side of the tool. The upper wall portion 64, especially, the side surface 78 defines a chip pocket 80. The chip pocket 80 is configured to simplify generation, storage and discharge of chips, especially discharge of the chip. The chip pocket 80 is configured to be recessed across the distance substantially the same as the length of the insert attachment seat 62 from the outer periphery toward the inner portion of the end mill body 12, and especially, to have the recess amount increased as it approaches the leading end side.

The side surface 78 is configured to form the right angle with the bottom wall surface 68 of the insert attachment seat 62. The upper wall portion 64 is provided so as not to interfere with screwing of the fixing screw 60 into the screw hole 74. Not interfering with screwing means that the upper wall portion 64 is not provided at least on the extended line of insertion path of the screw, for example, so as not to interfere with the operation using such tool as the screwdriver.

The upper wall portion 64 will further be described. Any one of the upper wall portions 64 overhangs one corresponding insert attachment seat 62, which is capable of covering at least a part of the cutting insert 10 in the insert attachment seat 62. Another insert attachment seat 62 adjacent to the corresponding insert attachment seat 62 is formed in the upper wall portion 64. In the other words, the respective upper wall portions 64 of the end mill body 12 are formed to extend the bottom wall surface 68 of one insert attachment seat 62 on the end mill body 12 up to the portion above the adjacent insert attachment seat 62. Each of the upper wall portions 64 is a portion surrounded by the bottom wall surface 68 of the certain insert attachment seat 62, the upper wall surface 76 with respect to another insert attachment seat 62 positioned to the rear of the bottom wall surface 68 in the tool revolting direction T, the side surface 78, the outer peripheral surface 12c of the end mill body 12, and the leading end surface 12d. The aforementioned upper wall portion 64, with respect to another insert attachment seat 62 adjacent to the insert attachment seat 62 corresponding to the overhanging upper wall portion 64, forms a back metal for fixing and supporting the cutting insert 10 therein.

With the cutting edge replaceable end mill 14, the cutting insert 10 is inserted into the insert attachment seat 62 while being pushed against (abutted on) the side wall surface 70 and the end wall surface 72 of the insert attachment seat 62. In the state where one of the flat surfaces 34 is seated on the bottom wall surface 68 of the insert attachment seat 62, the mount screw 60 is screwed into the screw hole 74 through the mounting hole 24 of the cutting insert 10. Consequently, the cutting insert 10 serving as the edge portion is attached to the insert attachment seat 62 of the end mill body 12.

Figure 12:
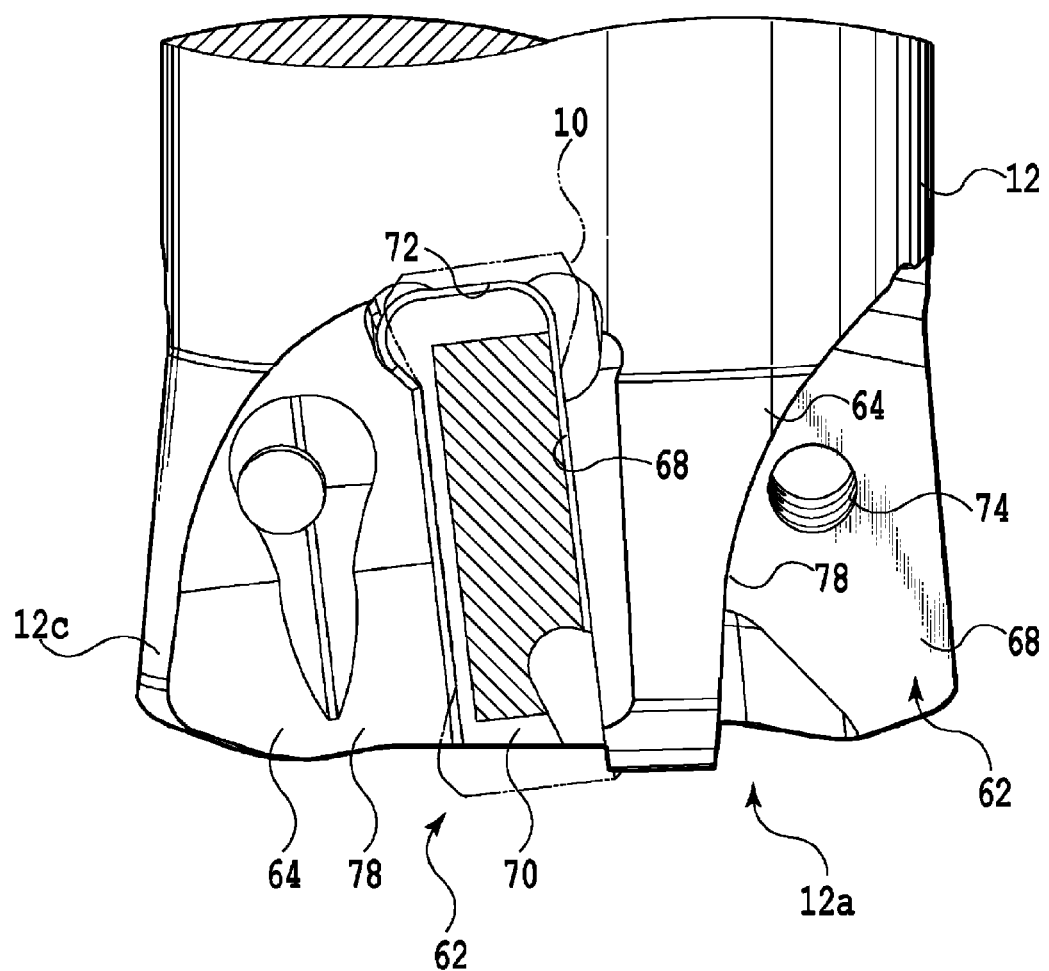
FIG. 12 is a view of the leading end portion of a tool body in the state where the cutting inserts are removed from the cutting edge replaceable cutting tool shown in FIG. 8 when seen from side of the tool body.
Figure 13:
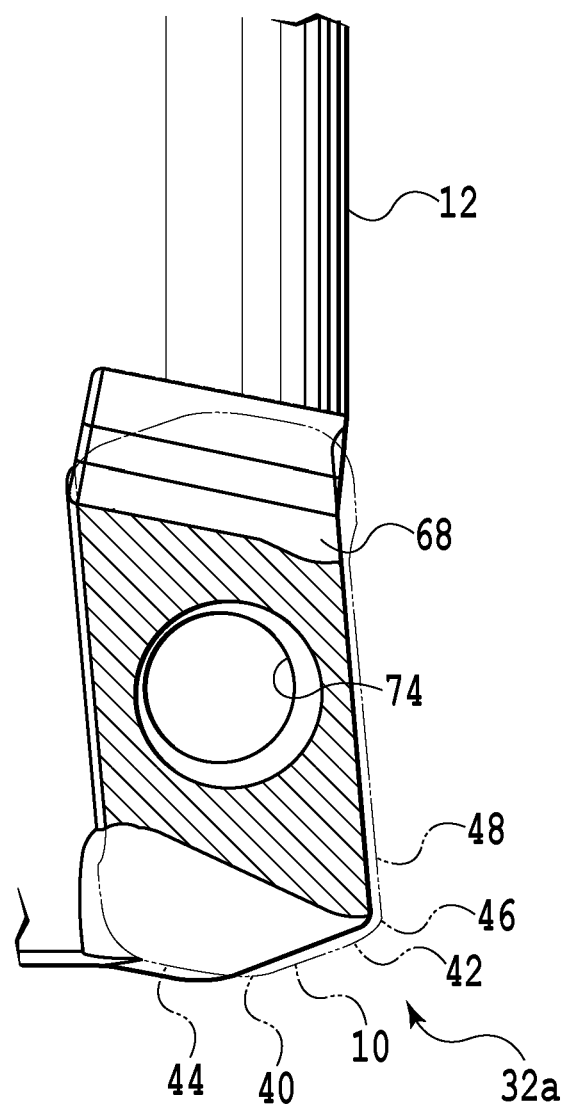
FIG. 13 is a front view of an insert attachment seat having the upper wall surface of the leading end portion of the tool body removed in the state where the cutting inserts are removed from the cutting edge replaceable cutting tool shown in FIG. 8.
Figure 14:
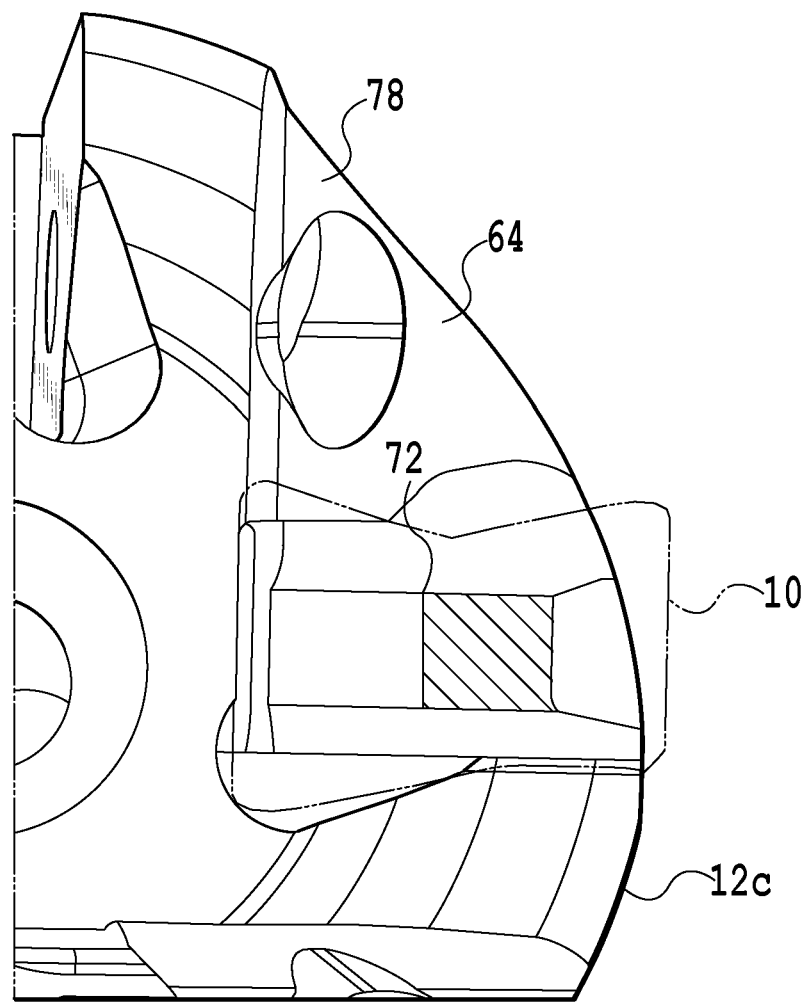
FIG. 14 is a view of the leading end portion of the tool body in the state where the cutting inserts are removed from the cutting edge replaceable cutting tool shown in FIG. 8 when seen from the side of the leading end portion of the tool body.
Figure 15:
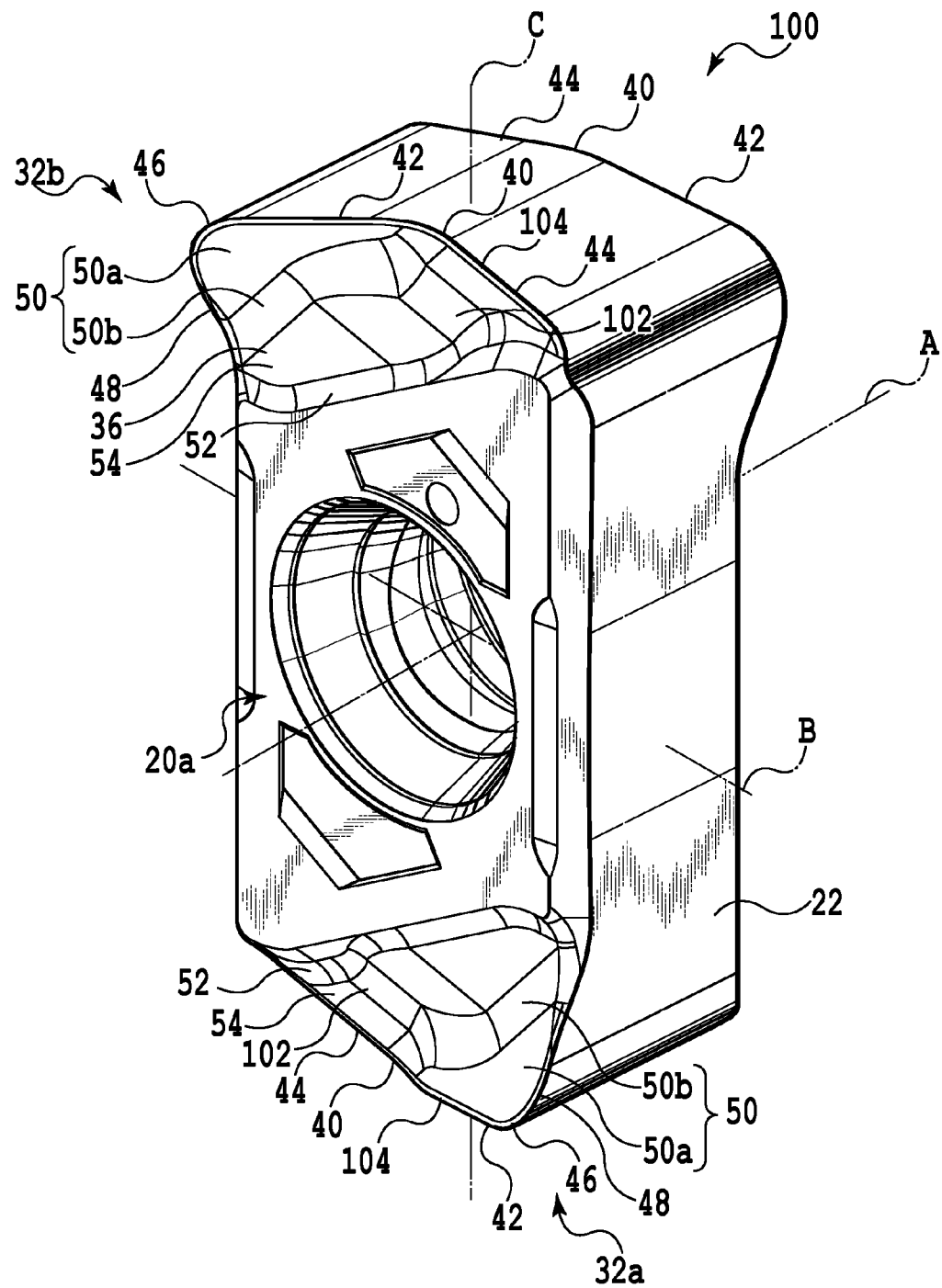
FIG. 15 is a perspective view showing a cutting insert according to a second embodiment of the present invention.
Figure 16:
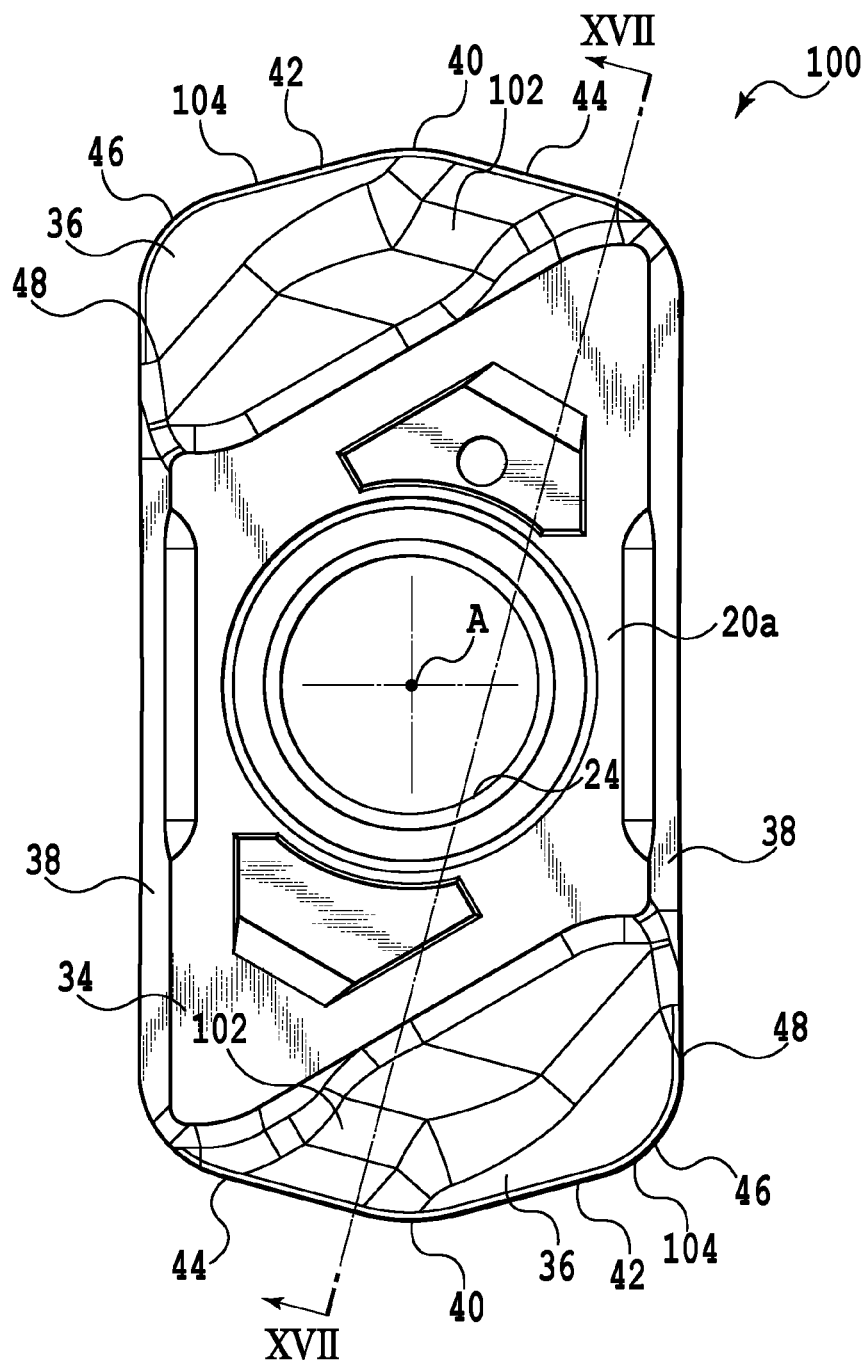
FIG. 16 is a plan view of the cutting insert shown in FIG. 15.

Each shaded portion in FIGS. 12 to 14 indicates the area on which the cutting insert 10 abuts in the insert attachment seat 62 upon attachment of the cutting insert 10 thereto. It should be noted that the cutting insert 10 is shown by a dashed line in FIGS. 12 to 14. As those drawings clearly show, upon attachment of the cutting insert 10 to the insert attachment seat 62, the cutting insert 10 abuts on the bottom wall surface 68, the side wall surface 70 and the end wall surface 72 of the insert attachment seat 62, respectively so as to be supported by them. Especially, as FIG. 13 clearly shows, in the aforementioned state, substantially the entire part of the flat surface 34 of the cutting insert 10 abuts on the bottom wall surface 68. This means that the back side portion of the major cutting edge 42 of the cutting edge portion 32 which is made available for cutting and positioned on the surface side securely abuts on the bottom wall surface 68, and thereby the force applied to the major cutting edge 42 can be solidly received by the insert attachment seat 62.

The base end 12b of the end mill body 12 to which the cutting insert 10 is attached via a holder is mounted on the main shaft of the machine tool. The cutting edge replaceable end mill 14 attached to the machine tool is revolved in the revolving direction designated as a code T in FIG. 8 around the axis D, and is fed in the direction which intersects the axis D while being in contact with the workpiece such as steel fixed on the machine tool table. This makes it possible to subject mechanical parts like die as a representative example to the cutting work using the cutting edge replaceable end mill 14.

Figure 9:
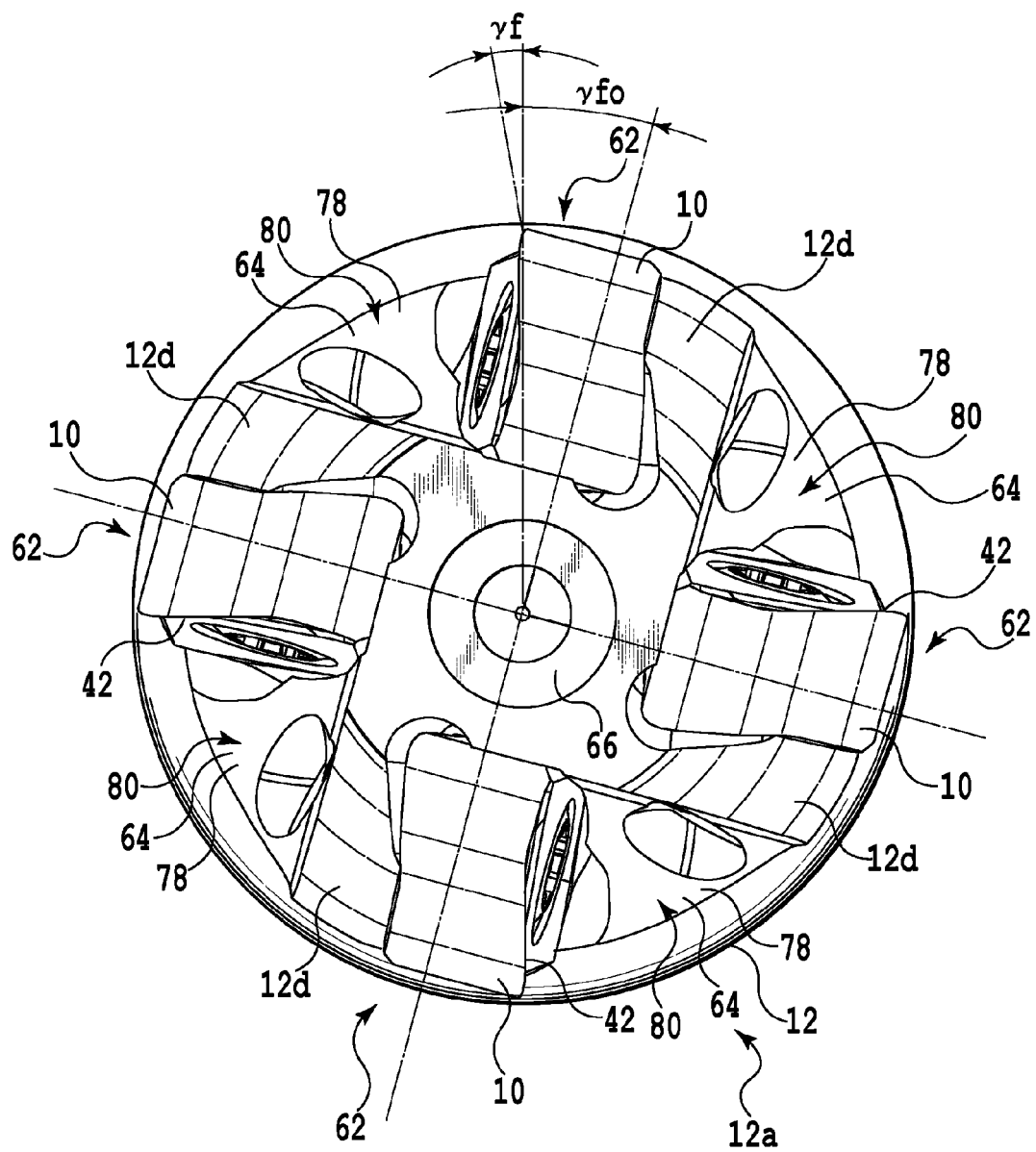
FIG. 9 is a plan view showing a leading end portion of the cutting edge replaceable cutting tool shown in FIG. 8.

As shown in FIGS. 9 to 11, the insert attachment seat 62 is configured so as to have a pocket shape, that is, a recessed groove shape, as described above, in the leading end portion of the end mill body 12, and arranged so that the radial rake angle (radial rake) $\gamma f0$ and the axial rake angle (axial rake) $\gamma p0$ become negative for the purpose of avoiding interference of the relief surface. In this case, the insert attachment seat 62 is configured so that the radial rake angle (radial rake) $\gamma f0$ is set to $-15°$, and the axial rake angle (axial rake) $\gamma p0$ is set to $-7°$. Consequently, the cutting insert 10 is attached to the insert attachment seat so that the radial rake angle (radial rake) $\gamma f0$ and the axial rake angle (axial rake) γp0 become negative. In this case, the radial rake angle (radial rake) γf of the major cutting edge 42 and the axial rake angle (axial rake) γp of the second minor cutting edge 48 as the outer peripheral edge are set to 5.7° and 13°, respectively when the aforementioned cutting insert 10 is attached to the insert attachment seat 62 as described above.

Effects of the thus structured cutting insert 10 according to the first embodiment and the cutting edge replaceable end mill 14 using the cutting insert will be described hereinafter.

Since in the cutting insert 10, the major cutting edge 42 extends from one end of the first corner edge 40 so that the distance between the major cutting edge 42 and the intermediate plane M is longer than the distance between the flat surface 34 of the related end surface 20 and the intermediate plane M, thickness of the inner side of the major cutting edge 42 is larger than the thickness of the cutting insert 10 between the flat surfaces 34. This may improve rigidity of the cutting insert 10 at a portion where the major cutting edge 42 is provided. When conducting high-feed cutting using the end mill 14, damage to the portion around the major cutting edge 42 may be suppressed even if large load is exerted to the major cutting edge 42. In addition, with respect to the foregoing, the distance between the major cutting edge 42 and the first minor cutting edge 44 positioned at the back side of the insert is elongated, and thereby, in the case where the major cutting edge 42 becomes deficient or the like during its use, damage to the cutting edge at the back side may be prevented. As a result, this may prolong utilization life of the cutting insert 10.

Furthermore, the major cutting edge 42 is the inclined edge which extends away from the intermediate plane M as it departs from the first corner edge 40. Therefore, when attaching the cutting insert 10 to the insert attachment seat 62, the radial rake angle (radial rake) γf of the major cutting edge 42 is directed to the positive side compared to the attachment attitude (γf0=−15°) of the cutting insert 10, and set to 5.7°. Consequently, the chip discharging direction may be controlled to the inside of the end mill body 12. As a result, the chip generated by cutting operation is gathered inside the end mill body 12, and appropriately discharged via the chip pocket. This makes it possible to prevent the chip flowing to the outside of the end mill body 12 from being caught between the end mill body 12 and the workpiece in the case where a groove is processed etc. Therefore, they are advantageous in consideration of the chip discharging. As a result, chipping owing to trap of the chip, tool deficiency, and damage to the worked surface and the like may be prevented for prolonging the tool life and improving the processing accuracy.

In addition, the first minor cutting edge 44 as the inner peripheral edge in the cutting insert 10 extends from the other end of the first corner edge 40 so that the distance between the first minor cutting edge 44 and the intermediate plane M is shorter than the distance between the flat surface 34 of the related end surface 20 and the intermediate plane M. Consequently, even if the cutting insert 10 is attached to the end mill body 12 so that the radial rake angle (radial rake) γf0 becomes negative, the first minor cutting edge 44 never protrudes farther than the major cutting edge 42 to the front of the tool revolving direction T. This makes it possible to prevent damage to the worked surface owing to abutment of the relief surface formed on the peripheral side surface 22 connected to the first minor cutting edge 44 of the cutting insert 10 on the workpiece upon cutting process. This also makes it possible to suppress damage to the first minor cutting edge 44 owing to friction passage and impingement of the chip.

At least half of the first minor cutting edge 44 extends in parallel with the flat surface 34 and consequently, this may minimize the difference in height between the first minor cutting edge 44 and the flat surface 34 in the front view, and form the flat surface 34 to the portion adjacent to the first minor cutting edge 44. As a result, this makes it possible to obtain a wide area of the flat surface 34 as the attachment surface to the end mill body 12, and further improve mount rigidity of the cutting insert 10.

The second minor cutting edge 48 in the cutting insert 10 extends from the second corner edge 46 so that the distance between the second minor cutting edge 48 and the intermediate plane M becomes longer than the distance between the flat surface 34 of the related end surface 20 and the intermediate plane M. Consequently, the thickness of the inside of the second minor cutting edge 48 is larger than the thickness between the flat surfaces 34 of the cutting insert 10. This may improve rigidity of the cutting insert 10 at the portion where the second minor cutting edge 48 is provided.

Furthermore, the second minor cutting edge 48 as the outer peripheral edge is configured to be inclined to approach the intermediate plane M as it departs from the second corner edge 46. Consequently, in the case where the cutting insert 10 is attached to the insert attachment seat 62, the axial rake angle (axial rake) γp of the second minor cutting edge 48 is directed to the positive side compared to the mount attitude (γp0=−7°) of the cutting insert 10, and set to 13°. This makes it possible to improve sharpness, and to reduce cutting resistance.

In addition, the flat surface 34 in the cutting insert 10 is configured to extend to be near the end portion opposite to the one connected to the first corner edge 40 of the first minor cutting edge 44 of the adjacent cutting edge portion 32. So the flat surface 34 serving as the attachment surface to the end mill body 12 is allowed to be provided up to the portion near the end portion of the first minor cutting edge 44 positioned at the back side of the major cutting edge 42 used for cutting operation (referring especially to FIG. 13). Therefore, even if a large load is exerted to the major cutting edge 42 upon cutting process, the flat surface 34 provided at the back side is capable of supporting the cutting insert 10 stably. In case of using the cutting insert 10 for the high-feed cutting, the cutting insert does not float from the bottom wall surface of the insert attachment seat during cutting process, thus preventing it from rattling and deviating. This makes it possible to prevent chatter vibration and damage to the cutting edge during the cutting process caused by insufficient attachment rigidity of the cutting insert 10.

Since in the cutting insert 10, the concave groove-like chip breaker 36 connected to the cutting edge portion 32 is provided, the cutting resistance may be reduced in the case where the cutting insert 10 is attached to the end mill body 12 so that the axial rake angle (axial rake) becomes negative. In this case, as the major cutting edge 42 in the cutting insert 10 is configured to protrude farther than the flat surface 34, that is, the virtual surface IS as described above, the distance between the virtual surface that contains the flat surface 34 and the bottom of the chip breaker may be decreased compared to the cutting insert that includes the chip breaker with the same inclined angle of the rake surface and the depth of the breaker, and the major cutting edge 42 with the same height as that of the flat surface 34. This makes it possible to improve rigidity of the cutting insert 10, requiring smaller area of the second inclined portion 52. Therefore, this makes it possible to enlarge the flat surface 34 as the attachment surface to the end mill body 12, thus improving mount rigidity of the cutting insert 10.

In addition, since the distance between the bottom portion 54 and the intermediate plane M is shorter than the distance between the related flat surface 34 and the intermediate plane M, in case of the high-feed cutting, the chip flowing from the major cutting edge 42 may be prevented from being in direct contact with the flat surface 34 on the same surface as the surface which has the major cutting edge 42, and accordingly, keeping the flat surface 34 from being damaged. Thereafter, when inverting the surfaces of the cutting insert 10 for using the flat surface 34 as the attachment surface to the end mill body 12, excellent mount rigidity may be maintained.

The line L1 which extends along the intersection 56 between the second inclined portion 52 of the chip breaker 36 and the flat surface 34 intersects the line L2 which extends along the major cutting edge 42 not in parallel with each other. The angle γ formed by the line L1 extending along the intersection 56 and the line L3 extending along the first minor cutting edge 44 is set larger than the external angle x (x=180°−α) that is defined assuming that the angle α formed by the line L2 extending along the major cutting edge 42 and the line L3 extending along the first minor cutting edge 44 is set as the internal angle. So, in consideration of improvement of chip controllability, even if the distance (breaker width) between the major cutting edge 42 and the flat surface 34 is set to be large, the flat surface 34 may be enlarged up to the portion around the corner of the end surface connected to the end portion opposite to the one connected to the first corner edge 40 of the first minor cutting edge 44. Accordingly, the cutting insert 10 is excellent in the mount rigidity and mount stability.

In the cutting edge replaceable end mill 14, the upper wall surface 76 of the upper wall portion 64 is provided, which is opposite to the bottom wall surface 68 of the insert attachment seat 62 and gradually overhangs from the leading end side to the base end side. Consequently, the cutting insert 10 is attached to the insert attachment seat 62 so that another cutting edge portion 32 existing on the same end surface 20 on which the cutting edge portion 32 used for cutting exists is surrounded by the bottom wall surface 68, the side wall surface 70 and the end wall surface 72 of the insert attachment seat 62, and the upper wall surface 76 of the upper wall portion 64. That is, when the cutting insert 10 is attached to the insert attachment seat 62, the unused cutting edge 32 diagonally provided with respect to the one used for cutting on the same end surface is protected while being completely covered by the upper wall portion 64. Therefore, even if the major cutting edge 42 rises as described above, the flowing chips will not damage the unused major cutting edge 42 in contact therewith. Because of this, even in the case of the high-feed cutting, the unused cutting edge portion 32 is not damaged by the chips. Therefore, the cutting insert 10 ensures to allow all the cutting edge portions 32 available, resulting in improved economic efficiency.

In addition, when seating the cutting insert 10 in the insert attachment seat 62, the cutting insert 10 is interposed between the bottom wall surface of the insert attachment seat 62 and the upper wall surface, and is engaged with the insert attachment seat by the rising major cutting edge 42 for limiting the movement to a certain degree. This may eliminate the need of pressing the cutting insert with hand when tightening the fixing screw. Accordingly, replacement of the cutting edge or replacement of the cutting insert may be easily conducted within a short period of time. For example, when using the small cutting insert, the structure may prevent the operator from dropping the cutting insert or the fixing screw, thus improving the working efficiency.

As described above, the thickness of the back metal may be increased by an overhanging amount corresponding to the overhanging of the upper wall portion to the adjacent insert attachment seat. This may improve rigidity of the end mill 14.

The cutting insert 10 which allows the flat surface 34 of the end surface 20 and the peripheral side surface 22 to form right angle is excellent in rigidity compared to different cutting insert. This may enlarge the flat surface 34 as the attachment surface to the end mill body 12 and the cutting insert 10 is excellent in mount rigidity. Furthermore, the edge portion at the long side on the end surface of the cutting insert 10 which is in contact with the side wall surface of the insert attachment seat upon attachment is chamfered for reinforcement, and so, the cutting insert 10 is excellent in rigidity.

Each of four cutting edge portions 32a, 32b, 32c and 32d of the cutting insert 10 has revolution symmetry around the axes A, B and C, respectively, and the cutting edge for use may be replaced by revolving the cutting insert 10 or inverting the surfaces thereof. Specifically, the cutting insert 10 may be used four times, which is remarkably economical.

In addition, in the cutting insert 10, the angle α formed by the major cutting edge 42 and the first minor cutting edge 44 is set to 150° which is a large value. The cutting edge angle κ of the major cutting edge 42 when attaching the cutting insert 10 to the end mill body 12 is set to 19° which is a small value. Accordingly, the cutting insert 10 is capable of increasing the feed amount per a single edge. This makes it possible to accelerate the feed speed of the end mill 14, thus further improving high efficiency of the cutting work.

A cutting insert 100 according to a second embodiment of the present invention, which has a structure different from that of the cutting insert 10 will be described referring to FIGS. 15 to 18. The difference between the cutting inserts 10 and 100 will be mainly described hereinafter. The same components of the cutting insert as those of the cutting insert 10 will be designated with the same reference numerals, and the same explanations, thus, will be omitted. The cutting insert 100 may be changed likewise the cutting insert 10 within a range with consistency so as to provide the same effects as those derived from the cutting insert 10.

Figure 17:
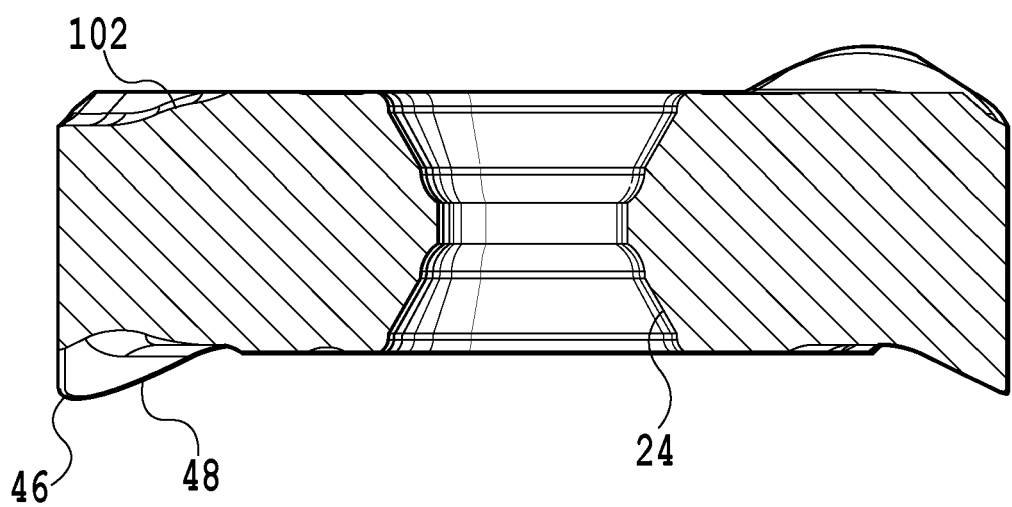
FIG. 17 is a sectional view of the cutting insert cut in a plane along line XVII-XVII shown in FIG. 16.
Figure 18:
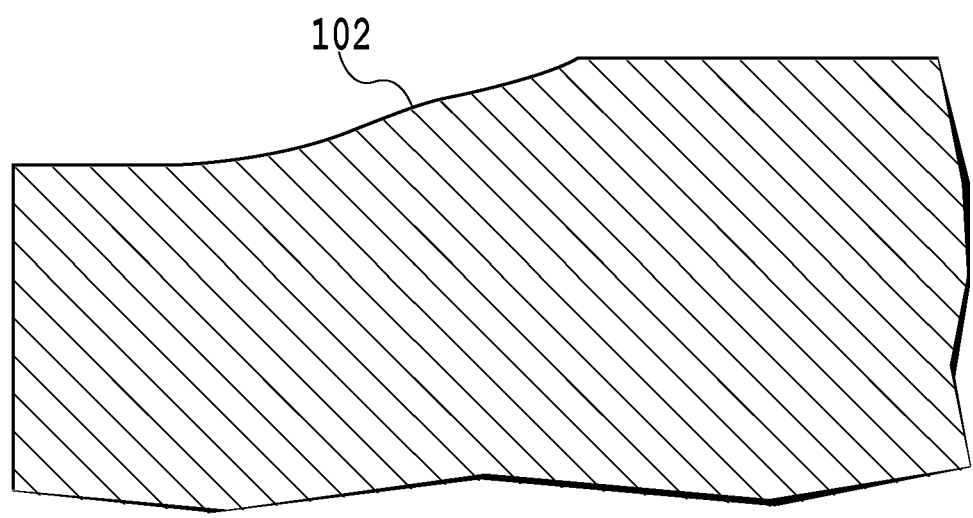
FIG. 18 is an enlarged view of a portion around a chip breaker shown in FIG. 17.

The cutting insert 100 has a convex portion 102 at the chip breaker 36. Especially as shown in FIGS. 17 and 18, the convex portion 102 is formed on the bottom portion 54 for controlling the chips flowing from the first minor cutting edge 44. The convex portion 102 is formed to rise from the bottom portion 54 in the direction of the axis A of the cutting insert 100, that is, outward apart from the first minor cutting edge 44 at a predetermined interval. The chips flowing from the first minor cutting edge 44 may be trapped by the convex portion 102.

In the cutting insert 100, a land 104 is provided between the cutting edge portion 32 and the chip breaker 36. It is possible to provide the land for the cutting insert 10 as described above.

It should be noted that the cutting insert 100 may be attached to the end mill main body 12 for use likewise the cutting insert 10.

The present invention has been described referring to two embodiments as described above. The present invention, however, is not limited to those embodiments. In both the embodiments, the insert formed of the flat hexagonal plate is employed. The single cutting insert includes two cutting edges at opposite obtuse corners of the hexagonal surface, and four cutting edges on both surfaces. The configuration and the number of cutting edges of the insert are not limited to those values as described above. For example, the insert formed of flat lozenge plate provided with two cutting edges at opposite obtuse corners of the lozenge surface, and four cutting edges on both surfaces may be employed. Alternatively, the insert formed of flat octagonal plate provided with three cutting edges at revolution symmetric positions through 120° in the octagonal surface, and six cutting edges on both surfaces may be employed as well. The size of the insert is not particularly limited. Dimension of the cutting insert may be arbitrarily set.

Cutting edges are formed in both surfaces of the cutting insert according to both embodiments. However, it is possible to form the cutting edge only in one surface of the cutting insert. However, it is preferable to form the cutting edges in both surfaces of the cutting insert in consideration of the cost.

In both embodiments, the flat surface is provided in end surface of the cutting insert as the main surface available as the attachment surface to the tool body. However, the main surface is not limited to the flat surface, which may be formed to have concavo-convex shape or curved shape. The bottom wall surface of the insert attachment seat may have the shape corresponding to the main surface of the cutting insert.

In the cutting insert according to the aforementioned embodiment, the cutting edge portion includes the first corner edge serving as the bottom edge, the first minor cutting edge serving as the internal peripheral edge and the second minor cutting edge serving as the external peripheral edge. The structure of the cutting edge portion is not limited to the one as described above. For example, in the cutting insert for the cutting edge replaceable milling, the first corner edge may be used as a face cutting edge and the second minor cutting edge may not be provided. Alternatively, flat cutting edge and wiper edge may be employed.

According to the aforementioned embodiments, the inclined edge which is linearly inclined is employed as the major cutting edge. However, configuration of the major cutting edge is not limited to the one as described above. Alternatively, the major cutting edge may be inclined in the arc-like manner.

In the aforementioned embodiments, the inclined angle θ of the major cutting edge is set to 18°. However, the inclined angle θ of the major cutting edge is not limited to the one as described above, and may be set to an arbitrary value. In consideration of improvement of chip controllability, it is preferable to set the inclined angle θ of the major cutting edge to be in the range from the value equal to or larger than 15° to the value equal to or smaller than 25°. If the angle is smaller than 15°, the radial rake angle (radial rake) γf cannot be directed to the positive side when the insert is attached to the end mill body, causing the risk of failing to control the chip flowing direction to the inside of the end mill body. If the inclined angle θ of the major cutting edge is larger than 25°, there may be the risk of deteriorating strength of the cutting edge.

In the aforementioned embodiments, at least half of the first minor cutting edge is formed so as to be parallel to the flat surface. Alternatively, the first minor cutting edge may be formed to gradually retract in the thickness direction of the insert as it departs from the first corner edge, that is, to approach the intermediate plane M as it departs from the first corner edge.

In the aforementioned embodiments, the angle α formed by the major cutting edge and the first minor cutting edge is set to 150°, and the cutting edge angle κ of the major cutting edge when attaching the insert to the end mill body is set to 19°. However, the angle α formed by the major cutting edge and the first minor cutting edge, and the cutting edge angle κ are not limited to those values, and may be set to the other arbitrary values. Considering the use for the high-feed cutting where the large load is exerted during cutting, it is preferable to set the angle α formed by the main cutting edge and the first minor cutting edge to be in the range from the value equal to or larger than 130° to the value equal to or smaller than 170°. It is preferable to set the cutting edge angle κ of the major cutting edge to be in the range from the value equal to or larger than 5° to the value equal to or smaller than 30°. If the angle α formed by the major cutting edge and the first minor cutting edge is smaller than 130°, and the cutting edge angle κ of the major cutting edge is larger than 30°, the feed amount per single edge cannot be increased, thus causing the risk of failing to achieve highly efficient cutting work. If the angle α formed by the major cutting edge and the first minor cutting edge is larger than 170°, and the cutting edge angle κ of the major cutting edge is smaller than 5°, it may be difficult to form a cut area.

In the aforementioned embodiments, the single chip breaker is provided for the single cutting edge portion. However, the chip breaker does not have to be provided.

The cutting edge replaceable cutting tool according to the present invention is not limited to the aforementioned embodiments, and is allowed to employ the structure as described below.

In the aforementioned embodiments, the upper wall portion with respect to the insert attachment seat is configured so that the overhanging amount is generally increased from the leading end side to the base end side in the end mill body. However, configuration, overhanging amount and the like of the upper wall portion are not specifically limited, which may be arbitrarily set. The upper wall portion does not have to cover at least a part of the cutting insert when attaching the cutting insert to the insert attachment seat. In this case, rigidity of the end mill may be improved to the degree corresponding to the overhanging amount of the upper wall portion.

In the aforementioned embodiments, the insert attachment seat is provided so that the radial rake angle (radial rake) γf0 becomes −15°, and the axial rake angle (axial rake) γp0 becomes −7°. However, the arrangement direction of the insert attachment seat is not limited to those values as described above, which may be arbitrarily set. Considering the use of the insert with negative configuration, it is preferable to arrange the insert attachment seat so that the mount attitude of the insert becomes negative.

In the aforementioned embodiment, the radial rake angle (radial rake) γf of the major cutting edge is set to 5.7° when attaching the aforementioned cutting insert to the insert attachment seat. The radial rake angle (radial rake) γf of the major cutting edge is not limited to the aforementioned value, which may be arbitrarily set. In consideration of improving chip controllability, it is preferable to set the radial rake angle (radial rake) γf to be in the range from the value equal to or larger than 0° to the value equal to or smaller than 30°. If the angle is smaller than 0°, the chip resultant from cutting may flow outside the end mill body, causing the risk of being caught between the end mill body and the workpiece. In order to increase the angle to be larger than 30°, the inclined angle θ of the major cutting edge of the aforementioned cutting insert has to be enlarged. In such a case, there may be the risk of failing to maintain the cutting edge strength.

In the aforementioned embodiments, four insert attachment seats and four chip pockets are provided. However, numbers of the insert attachment seats and the chip pockets are not limited to those values as described above, which may be arbitrarily set in accordance with the diameter of the end mill body and the like.

In the aforementioned embodiments, the cutting insert is attached to the tool body using screw. However, means for attaching the cutting insert to the tool body is not limited to means to use a screw. It is possible to mechanically attach the cutting insert to the tool body as described above and it is also possible to chemically conduct the attachment.

The present invention has been described taking the cutting edge replaceable end mill as an example of the cutting edge replaceable cutting tool using the cutting insert according to the present invention. However, the present invention is not limited to the one as described above. For example, the present invention may be applied to various types of cutting edge replaceable cutting tool, for example, the milling, reamer, drill, boring cutter and the like as the cutting edge replaceable revolving tool. The present invention is applicable to the cutting edge replaceable cutting tool, in which the tool, for example, a boring tool is fixed and the workpiece is revolved.

It should be noted that, in the embodiments, the modifications thereof and the like, the present invention is explained in a certain degree of concreteness, but the present invention is not limited to these special examples. It should be understood that the present invention can be modified or changed variously without departing from the spirit or the scope of the invention described in claims. That is, the present invention includes all modifications, applications and its equivalents contained in the concept of the present invention as defined in claims.

What is claimed is:

1. A cutting insert, comprising:
    an end surface including a first surface, a back side of the first surface being a second surface which is usable as an attachment surface to a tool body, the end surface having an edge portion comprising a first pair of parallel side portions oppositely positioned to each other in a plan view of the cutting insert; and
    a cutting edge portion is formed on the edge portion of the end surface, wherein:
    an intermediate plane, which is perpendicular to a first axis passing through the first surface and the second surface and passes through the cutting insert, is defined, the intermediate plane being located between the first surface and the second surface;
    the cutting edge portion includes:
        a corner edge formed at a corner of said end surface;
        a major cutting edge extending from one end of the corner edge, and extending so that a distance between the major cutting edge and the intermediate plane becomes longer than a distance between the first surface and the intermediate plane; and
        a minor cutting edge extending from the other end of the corner edge, and extending so that a distance between the minor cutting edge and the intermediate plane becomes shorter than a distance between the first surface and the intermediate plane.

2. A cutting insert, comprising:
    two opposed end surfaces, each end surface having a main surface usable as an attachment surface to a tool body and including in an edge portion thereof, a first pair of parallel side portions oppositely positioned to each other in a plan view of the cutting insert;
    a peripheral side surface extending between the two end surfaces; and
    a plurality of cutting edge portions, each formed at an intersection between each end surface and the peripheral side surface, wherein:
    the plurality of cutting edge portions have rotational symmetry around a first axis which passes through the two end surfaces, and rotational symmetry around a second axis which is perpendicular to the first axis and passes through the peripheral side surface; and
    an intermediate plane, which is perpendicular to the first axis and passes through the peripheral side surface including the second axis, is defined; and wherein
    each cutting edge portion includes:
        a corner edge formed at a corner of a related end surface;
        a major cutting edge extending from one end of the corner edge, and extending so that a distance between the major cutting edge and the intermediate plane becomes longer than a distance between the main surface of the related end surface and the intermediate plane; and
        a minor cutting edge extending from the other end of the corner edge, and extending so that a distance between the minor cutting edge and the intermediate plane becomes shorter than a distance between the main surface of the related end surface and the intermediate plane.

3. The cutting insert according to claim 2, wherein said main surface is a flat surface.

4. The cutting insert according to claim 3, wherein each end surface has a substantially hexagonal contour.

5. The cutting insert according to claim 4, wherein, in the plan view, the side portions in the first pair are connected by two pairs of short side portions oppositely positioned to each other, each of the side portions in the first pair being longer than the short side portions.

6. The cutting insert according to claim 5, wherein:
    said corner edge is formed between two adjacent short side portions; and
    an angle formed by said major cutting edge and said minor cutting edge in the same cutting edge portion is larger than an angle formed by the major cutting edge and one of said side portions in the first pair which is adjacent to the major cutting edge.

7. The cutting insert according to claim 2, wherein at each cutting edge portion in each end surface, said main surface is formed so as to extend near an end portion of the minor cutting edge remote from where that minor cutting edge is connected to the corner edge.

8. A cutting insert, comprising:
    two opposed end surfaces, each end surface having a main surface usable as an attachment surface to a tool body;
    a peripheral side surface extending between the two end surfaces; and
    a plurality of cutting edge portions, each formed at an intersection between each end surface and the peripheral side surface, wherein:
    the plurality of cutting edge portions have rotational symmetry around a first axis which passes through the two end surfaces, and rotational symmetry around a second axis which is perpendicular to the first axis and passes through the peripheral side surface;
    an intermediate plane, which is perpendicular to the first axis and passes through the peripheral side surface including the second axis, is defined;
    each cutting edge portion includes:
        a corner edge formed at a corner of a related end surface;
        a major cutting edge extending from one end of the corner edge, and extending so that a distance between the major cutting edge and the intermediate plane becomes longer than a distance between the main surface of the related end surface and the intermediate plane; and
        a minor cutting edge extending from the other end of the corner edge, and extending so that a distance between the minor cutting edge and the intermediate plane becomes shorter than a distance between the main surface of the related end surface and the intermediate plane; and wherein in each cutting edge portion, said major cutting edge extends so as to depart from said intermediate plane with increasing distance from said corner edge.

9. A cutting insert, comprising:
two opposed end surfaces, each end surface having a main surface usable as an attachment surface to a tool body;
a peripheral side surface extending between the two end surfaces; and
a plurality of cutting edge portions, each formed at an intersection between each end surface and the peripheral side surface, wherein:
the plurality of cutting edge portions have rotational symmetry around a first axis which passes through the two end surfaces, and rotational symmetry around a second axis which is perpendicular to the first axis and passes through the peripheral side surface;
an intermediate plane, which is perpendicular to the first axis and passes through the peripheral side surface including the second axis, is defined;
each cutting edge portion includes:
a corner edge formed at a corner of a related end surface;
a major cutting edge extending from one end of the corner edge, and extending so that a distance between the major cutting edge and the intermediate plane becomes longer than a distance between the main surface of the related end surface and the intermediate plane; and
a minor cutting edge extending from the other end of the corner edge, and extending so that a distance between the minor cutting edge and the intermediate plane becomes shorter than a distance between the main surface of the related end surface and the intermediate plane; and wherein
in each cutting edge portion, at least half of said minor cutting edge extends in parallel to said main surface of a related end surface.

10. The cutting insert according to claim 2, wherein a concave chip breaker is formed between each cutting edge portion and said main surface of a related end surface.

11. The cutting insert according to claim 10, wherein:
each chip breaker includes a first inclined portion adjacent to an adjacent cutting edge portion, a second inclined portion adjacent to an adjacent main surface, and a flat bottom portion extending between said first inclined portion and said second inclined portion; and
a distance between the bottom portion of each chip breaker and said intermediate plane is shorter than a distance between said main surface of a related end surface and said intermediate plane.

12. The cutting insert according to claim 11, wherein a line extending along an intersection between said second inclined portion of each chip breaker and said main surface adjacent to the second inclined portion intersects a line extending along said major cutting edge of adjacent cutting edge portion.

13. A cutting insert, comprising:
two opposed end surfaces, each end surface having a main surface usable as an attachment surface to a tool body;
a peripheral side surface extending between the two end surfaces; and
a plurality of cutting edge portions, each formed at an intersection between each end surface and the peripheral side surface, wherein:
the plurality of cutting edge portions have rotational symmetry around a first axis which passes through the two end surfaces, and rotational symmetry around a second axis which is perpendicular to the first axis and passes through the peripheral side surface;
an intermediate plane, which is perpendicular to the first axis and passes through the peripheral side surface including the second axis, is defined;
each cutting edge portion includes:
a corner edge formed at a corner of a related end surface;
a major cutting edge extending from one end of the corner edge, and extending so that a distance between the major cutting edge and the intermediate plane becomes longer than a distance between the main surface of the related end surface and the intermediate plane; and
a minor cutting edge extending from the other end of the corner edge, and extending so that a distance between the minor cutting edge and the intermediate plane becomes shorter than a distance between the main surface of the related end surface and the intermediate plane; and wherein
each cutting edge portion further includes a second corner edge to which said major cutting edge extends, and a second minor cutting edge extending from the second corner edge.

14. A cutting edge replaceable cutting tool provided with a tool body to which the cutting insert according to claim 2 is detachably mounted, the tool comprising:
an insert attachment seat formed in said tool body, to which said cutting insert is attached; and
an upper wall portion integrally formed with said tool body and overhanging said insert attachment seat.

15. The cutting edge replaceable cutting tool according to claim 14, wherein:
said tool body includes a plurality of insert attachment seats and a plurality of upper wall portions for attaching a plurality of cutting inserts; and
another insert attachment seat adjacent to said insert attachment seat is formed on the upper wall portion which overhangs the insert attachment seat.

16. The cutting edge replaceable cutting tool according to claim 14, wherein said upper wall portion covers at least a part of the cutting insert when the cutting insert is attached to said insert attachment seat.

17. The cutting insert according to claim 13, wherein
in each cutting edge portion, the second minor cutting edge extends from the second corner edge such that a distance between the second minor cutting edge and the intermediate plane is longer than a distance between an adjacent main surface and the intermediate plane.

18. The cutting insert according to claim 2, wherein:
cutting edge portions which belong to different end surfaces and are aligned along a direction of the first axis, have rotational symmetry around the second axis;
each end surface further includes, in an edge portion thereof:
two pairs of short side portions oppositely positioned to each other and the corner edge is formed between two adjacent short side portions, each of the side portions in the first pair being longer than the short side portions; and
in a plan view of the cutting insert:
the major cutting edge and the minor cutting edge of each cutting edge portion extend from the corner edge in a same direction along the second axis so as to become further away from the second axis with increasing distance from the corner edge.

19. The cutting insert according to claim 1, wherein:
at least two cutting edge portions are formed on the edge portion of the end surface;
in a plan view of the end surface:
- at each cutting edge portion, the major cutting edge and the minor edge form an obtuse angle ($\alpha$) at the corner edge;
- two longitudinally spaced apart corner edges belonging to opposite cutting edge portions lay on an axis which is perpendicular to the first axis (A); and
- a distance between the two longitudinally spaced apart corner edges corresponds to a longitudinal length of the cutting insert.

20. The cutting insert according to claim 2, wherein, in a plan view of either end surface:
- the major cutting edge and the minor edge belonging to each cutting edge portion form an obtuse angle ($\alpha$) at the corner edge; and
- two longitudinally spaced apart corner edges belonging to opposite cutting edge portions lay on an axis which is perpendicular to the first axis (A); and
- a distance between the two longitudinally spaced apart corner edges corresponds to a longitudinal length of the cutting insert.

* * * * *